US011023889B2

(12) United States Patent
Izenson et al.

(10) Patent No.: US 11,023,889 B2
(45) Date of Patent: *Jun. 1, 2021

(54) ENHANCED MERCHANT IDENTIFICATION USING TRANSACTION DATA

(71) Applicant: Visa International Service Association, San Francisco, CA (US)

(72) Inventors: Martin D. Izenson, Foster City, CA (US); Linda McGee, Newark, CA (US); Mahesh Joshi, Foster City, CA (US); Tatyana Dubinsky, Foster City, CA (US); Basudeb Ghosh, Foster City, CA (US); Sathis Kumar Appukutty, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 75 days.

This patent is subject to a terminal disclaimer.

(21) Appl. No.: 16/380,749

(22) Filed: Apr. 10, 2019

(65) Prior Publication Data

US 2019/0236601 A1  Aug. 1, 2019

Related U.S. Application Data

(63) Continuation of application No. 14/522,355, filed on Oct. 23, 2014, now Pat. No. 10,304,056.

(51) Int. Cl.
*G06Q 20/40* (2012.01)
*G06Q 20/32* (2012.01)

(52) U.S. Cl.
CPC .......... *G06Q 20/40* (2013.01); *G06Q 20/322* (2013.01)

(58) Field of Classification Search
CPC .............................. G06Q 20/322; G06Q 20/40
USPC .................................................. 705/44
See application file for complete search history.

(56) References Cited

U.S. PATENT DOCUMENTS

| 2006/0085275 A1* | 4/2006 | Stokes ................... G06Q 30/00 705/27.1 |
| 2010/0057742 A1 | 3/2010 | Hardy-McGee |
| 2010/0057786 A1 | 3/2010 | Hardy-McGee |
| 2010/0058156 A1 | 3/2010 | Hardy-McGee |

(Continued)

FOREIGN PATENT DOCUMENTS

| WO | 2010025298 A2 | 3/2010 |
| WO | 2010025301 A2 | 3/2010 |

(Continued)

*Primary Examiner* — Namrata Boveja
*Assistant Examiner* — Liz P Nguyen
(74) *Attorney, Agent, or Firm* — Kilpatrick Townsend & Stockton LLP

(57) ABSTRACT

A system for identifying and associating merchant attributes data of a merchant with transaction data may be integrated with existing payment processing systems to provide for detailed merchant attributes data (e.g., merchant name, merchant ownership data, and merchant address data). The system may receive and modify merchant attributes data retrieved from an external source (e.g., an acquirer computer or third party to a transaction) and store the merchant attributes data in a database. The merchant attributes data may be retrieved and correlated with transaction data and provided to entities (e.g., issuer computers) involved with the transaction for authorization decisioning, fraud analysis, and data analytics.

20 Claims, 12 Drawing Sheets

(56) References Cited

U.S. PATENT DOCUMENTS

| | | | |
|---|---|---|---|
| 2010/0077464 A1 | 3/2010 | Hardy-McGee | |
| 2010/0106568 A1* | 4/2010 | Grimes | G06Q 30/0254 |
| | | | 705/14.1 |
| 2015/0220945 A1 | 8/2015 | Iannace et al. | |

FOREIGN PATENT DOCUMENTS

| | | |
|---|---|---|
| WO | 2010025304 A2 | 3/2010 |
| WO | 2010025306 A2 | 3/2010 |

\* cited by examiner

| Raw Merchant Name 202 | System 1 204 | System 2 206 | System 3 208 | System 4 210 | System 5 212 |
|---|---|---|---|---|---|
| Big Box Outlet - SF 22.49 | Big Box Outlet - SF | Big Box Outlet - SF 22.49 | Big Box Outlet | N/A | Big Box |
| Big Box Outlet $12.93 | Big Box $12.93 | Big Box Outlet $12.93 | Big Box | Big Box | Big Box |
| Shoes*BigBox*Outlet | BigBox*Outlet | Shoes*BigBox*Outlet | BigBox*Outlet | BigBoxOutlet | Big Box |

FIG. 2
(PRIOR ART)

| Raw Merchant Name 302 | Descriptor Merchant Name 304 | Parsed Merchant Name 306 | Normalized Merchant Name 308 | Doing Business As (DBA) 310 | Merchant Corporate Name 312 |
|---|---|---|---|---|---|
| Motel 5 Exprss #12 302a | Motel 5 Exprss #12 | Motel 5 Exprss | Motel 5 Express | Motel 5 | Hotels, Inc. |
| Motel Five Exprss #34 A213 302a | Motel Five Exprss #34 | Motel Five Exprss 306a | Motel 5 Express 308a | Motel 5 310a | Hotels, Inc. 312a |
| Big Box #0019 | Big Box #0019 | Big Box | Big Box | Big Box | Big Box Corporation |
| Big Box Outlet - SF | Big Box Outlet - SF | Big Box Outlet | Big Box Outlet | Big Box | Big Box Corporation |

| Raw Merchant Name 352 | Merchant Category Code (MCC) 354 | Selection Start | Selection End | Selection 356 | Descriptor Start | Descriptor End | Descriptor Merchant Name 358 | Parsed Start | Parsed End | Parsed Merchant Name 360 | Normalized Merchant Name 362 | Doing Business As (DBA) 364 | Merchant Corporate Name 366 |
|---|---|---|---|---|---|---|---|---|---|---|---|---|---|
| ABC's Cafe #1003 352a | 5812 354a | 1 | 12 | ABC's Cafe # 356a | 0 | 0 | ABCs Cafe #1003 358a | 1 | 10 | ABCs Cafe 360a | ABCs Cafe and Lounge 362a | ABCs Cafe and Lounge 364a | The Restaurant Group 366a |
| ABCs Cafe #5305 352b | 5812 354b | 1 | 11 | ABCs Cafe # 356b | 0 | 0 | ABCs Cafe #5305 358b | 1 | 9 | ABCs Cafe 360b | ABCs Cafe and Lounge 362b | ABCs Cafe and Lounge 364b | The Restaurant Group 366b |
| ABCz Cafe #9705 352c | 5812 354c | 1 | 11 | ABCz Cafe # 356c | 0 | 0 | ABCs Cafe #9705 358c | 1 | 11 | ABCs Cafe # 360c | ABCs Cafe and Lounge 362c | ABCs Cafe and Lounge 364c | The Restaurant Group 366c |

| Raw Merchant Geographic Location Data | | | | Enriched Merchant Geographic Location Data | | | |
|---|---|---|---|---|---|---|---|
| City | State | Zip | Country | City | State | Zip | Country |
| SALT LAKE CITY | UT | 84120 | US | SALT LAKE CITY | UT | 84120 | US |
| SALT LAKE CTY | UT | 84120 | US | SALT LAKE CITY | UT | 84120 | US |
| SALT LAKE CI | UT | 84101 | US | SALT LAKE CITY | UT | 84101 | US |
| SALT LAKE CITY | | 84106 | US | SALT LAKE CITY | UT | 84106 | US |
| SALT LAKE CITY | UT | 00000 | US | SALT LAKE CITY | UT | 84101 | US |
| SALT LAKE CTY | HI | 15258 | US | PITTSBURGH | PA | 15258 | US |

| Key Field 602 | Data Type 604 | Acquirer File Data 606 | Modified Acquirer File Data 608 | Third Party Data 610 | Primary Merchant Attribute 612 | Reserved 614 |
|---|---|---|---|---|---|---|
| 563476524 602a | Merchant Address 604a | 123 Main Blvd. San Francisco, CA 94111 606a | 123 Main St. San Francisco, CA 94111 608a | 123 Main St. Daly City, CA 94111 610a | 123 Main St. San Francisco, CA 94111 612a | |
| 849554489 | Merchant Name | Motel Five | Motel 5 | Motel 5 | Motel 5 | |
| 849556598 602b | Merchant Name 604b | Big Box Outlet - SF 606b | Big Box 608b | Big Box Outlet 610b | Big Box 612b | |
| 849556598 | Merchant Address | 555 Market St. San Francisco, CA 94106 | 555 Market St. San Francisco, CA 94105 | 555 Market Street San Francisco, CA 94105 | 555 Market St. San Francisco, CA 94105 | |
| 849556598 | Merchant Corporate Name | Big Box Corporation | N/A | N/A | Big Box Corporation | |

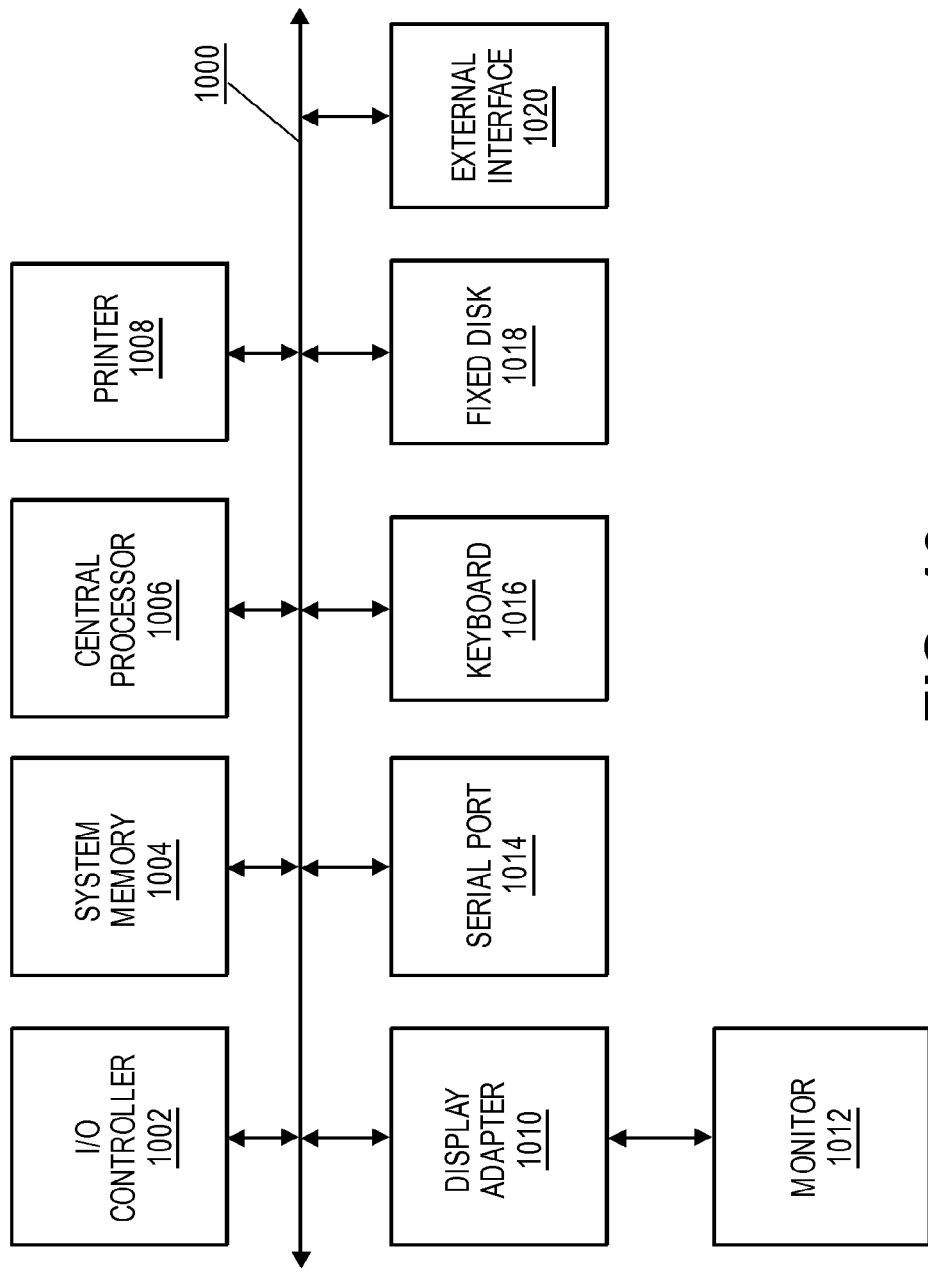

ENHANCED MERCHANT IDENTIFICATION USING TRANSACTION DATA

CROSS-REFERENCES TO RELATED APPLICATIONS

This application is a continuation of U.S. patent application Ser. No. 14/522,355 filed Oct. 23, 2014, the disclosure of which is incorporated by reference.

BACKGROUND

Transactions typically involve multiple parties, including a user (e.g., consumer), a merchant, an acquirer bank, and an issuer bank. While each user (e.g., a consumer), acquirer bank, and issuer bank may have a unique identifier (e.g., an account number, a bank identification number [BIN]) that may be consistently used, merchants typically do not have a single defined or unique identifier.

For example, a merchant may be identified by a merchant category code (MCC), a merchant name (e.g., "Big Box Store"), a merchant location (e.g., "Big Box Store—San Francisco", "Big Box Store Location #1293"), or a specific location within the merchant location (e.g., "Electronics Counter—Big Box Store Location #1293"). Increasing the difficulty is that in some cases, a merchant name and merchant location (e.g., city, state, zip code) may be free form text fields. The result may be that the merchant name for a single merchant may be different for different entities and systems.

FIG. 2 illustrates the current problem with how different entities and systems may use different designations for a merchant name associated with the same merchant location. Each row represents a merchant name associated with a single transaction, where each column is a different system (e.g., acquirer, issuer, payment processing network). The Raw Merchant Name 202 column illustrates the raw merchant name that may be in the transaction data (e.g., from an acquirer computer). Columns 204, 206, 208, 210, and 212 illustrate how the raw merchant name received in the transaction data may be translated/interpreted by a plurality of different systems.

The problem illustrated in FIG. 2 can make it difficult to accurately correlate related transactions and provide comprehensive analytics for a merchant. Even determining how many transactions were processed for a merchant may be difficult to ascertain because the merchant name data may not be consistent across a plurality of systems. In some situations, even internally, a system (e.g., System 3 208 in FIG. 2) may have different naming conventions for the same overall merchant (e.g., Big Box). For example, if you queried System 2 206 to determine how many transactions involved merchant "Big Box", it may not present the first and third transactions in FIG. 2, while if you sent the same query to System 5 212, all three transactions in FIG. 2 may be presented.

Even where merchant data is consistent, it may be able to provide limited value. For example, presently, merchant location data associated with a transaction is often limited to a zip code for the merchant location, which may provide only limited location information. While in some areas, zip codes may cover a relatively small and defined area (e.g., zip code 11109 covers 0.01 square miles), while other zip codes may cover a large region (e.g., zip code 89049 covers 1740 square miles). In the latter situation, the merchant zip code may not provide significantly valuable location information.

Embodiments of the invention address the above problems, and other problems, individually and collectively.

BRIEF SUMMARY

Embodiments of the invention are directed at methods, systems, and apparatuses for utilizing transaction histories and data from multiple parties to a transaction in order to generate enhanced merchant identification data and to generate more refined transaction and merchant analytics data. This allows for the enhanced merchant identification data to be assigned to authorization and clearing and settlement processes associated with transactions.

One embodiment of the invention is directed to a method comprising, receiving transaction data associated with a transaction between a user and a merchant by a server computer. The method further comprises retrieving a merchant identifier from the transaction data, and determining that the merchant identifier from the transaction data is in a supplemental data file. The supplemental data file may include merchant attributes data for the merchant. The method further comprises accessing, a merchant attributes database that includes the merchant identifier and the merchant attributes data for the merchant associated with the merchant identifier. The merchant attributes for the merchant stored in the merchant attributes database are retrieved using the merchant identifier. The method further comprises associating one or more of the merchant attributes data for the merchant stored in the merchant attributes database with the transaction data, the one or more of the merchant attributes data usable for correlating transactions associated with the merchant.

Another embodiment of invention is directed to a access server computer comprising a processor and a computer readable medium coupled to the processor, the computer readable medium comprising code, executable by the processor for implementing a method. The method comprises receiving transaction data associated with a transaction between a user and a merchant by the server computer. The method further comprises retrieving a merchant identifier from the transaction data, and determining that the merchant identifier from the transaction data is in a supplemental data file. The supplemental data file may include merchant attributes data for the merchant. The method further comprises accessing, a merchant attributes database that includes the merchant identifier and the merchant attributes data for the merchant associated with the merchant identifier. The merchant attributes for the merchant stored in the merchant attributes database are retrieved using the merchant identifier. The method further comprises associating one or more of the merchant attributes data for the merchant stored in the merchant attributes database with the transaction data, the one or more of the merchant attributes data usable for correlating transactions associated with the merchant.

Another embodiment of the invention is directed to a method comprising, receiving a supplemental data file from a remote server computer. The method further comprises analyzing merchant data stored in the supplemental data file against transaction data for previous transactions associated with the server computer. The merchant attributes data for a merchant from the supplemental data file are stored in a merchant attributes database when the remote server computer is a certified data source.

In such embodiments, the remote server computer is a certified data source when a percentage of the previous transactions associated with the server computer that can be matched to the supplemental data file exceeds a predetermined threshold.

Another embodiment of invention is directed to a access server computer comprising a processor and a computer readable medium coupled to the processor, the computer readable medium comprising code, executable by the processor for implementing a method. The method comprises receiving a supplemental data file from a remote server computer. The method further comprises analyzing merchant data stored in the supplemental data file against transaction data for previous transactions associated with the server computer. The merchant attributes data for a merchant from the supplemental data file are stored in a merchant attributes database when the remote server computer is a certified data source.

These and other embodiments of the invention are described in further detail below with reference to the Drawings and the Detailed Description.

BRIEF DESCRIPTION OF THE DRAWINGS

FIG. 2 illustrates merchant data according to the prior art.

FIG. 3A shows an exemplary merchant name table depicting merchant name data according to an embodiment of the present invention.

FIG. 3B shows a table illustrating an exemplary application of rules to merchant name data according to an embodiment of the present invention.

FIG. 4 shows an exemplary merchant location table depicting merchant location data according to an embodiment of the present invention.

FIG. 6 depicts an exemplary table of merchant attributes data stored in the merchant attributes database according to an embodiment of the present invention.

FIG. 10 shows a block diagram of a computer apparatus according to an embodiment of the invention.

DETAILED DESCRIPTION

Figure 1A:
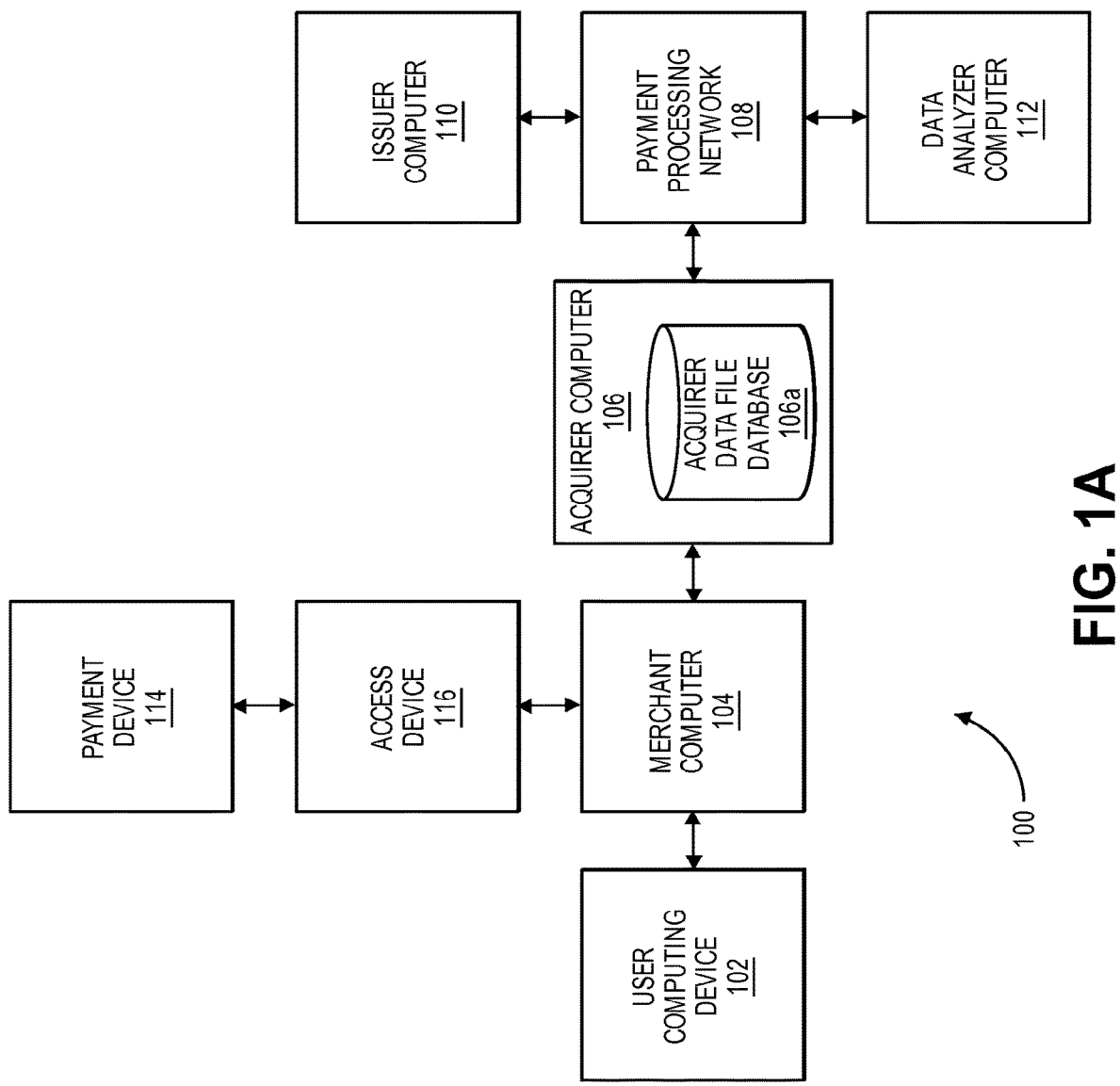
FIG. 1A shows a transaction processing system according to an embodiment of the present invention.

Typically, in a transaction, a consumer, an issuer bank, and an acquirer bank have consistent identifiers that allow each to be uniquely identified. These may include account numbers and bank identification numbers. This is not the case with merchants, who may be identified in various ways (e.g., merchant name, merchant location, merchant category code). Even where the merchant's name or merchant's location are used as the identifier, there is often a lack of consistency for the merchant's name. The merchant's name used by one acquirer bank may not be the same as one used a different acquirer bank, even for the same merchant at a same location. This can result in inaccurate tracking of transactions associated with merchants as two transactions from two different acquirer banks may not be understood as relating to the same merchant.

Embodiments of the invention address the above-noted consistency problem by normalizing merchant name and merchant location data into a uniform format for each merchant. This allows for improved matching of transactions associated with a particular merchant. In some embodiments, this improvement can result in enhanced tracking of transactions, particularly fraudulent transactions and fraud patterns. For example, fraud trends may not be as readily detectable without a consistency in transaction data associated with a particular merchant.

Embodiments of the invention also relate to enhancing the transaction data with additional merchant attributes (e.g., street address, ownership data), that are not typically included in standard transaction data. The additional merchant attributes allow for the generation of more detailed merchant statistics and analytical data, including the aforementioned fraud trends data.

Prior to discussing embodiments of the invention, descriptions of some terms may be helpful in providing a better understanding of the invention.

The term "transaction" may include an exchange or interaction between two entities. In some embodiments, a transaction may refer to transfer of value between two users (e.g. individuals or entities). A transaction may involve the exchange of monetary funds, or the exchange of goods or services for monetary funds between two individuals or entities. In other embodiments, a transaction may involve an individual or entity purchasing goods or services from a merchant or other entity in exchange for monetary funds. In other embodiments, the transaction may be a non-financial-related request, such as exchanging of data or information between two entities, such as the transfer of data.

The term "transaction data" may include information regarding a transaction. The information may include data for a financial transaction (e.g., payment data, transaction total, consumer data). The transaction data may be used for processing a financial transaction. Transaction data may include data for a specific transaction, including items purchased, item prices, total cost, consumer data (e.g., shipping address, email address), payment methods, authentication data, merchant data (e.g., merchant name, merchant location/address), etc. In some embodiments, transaction data may be generated once the user or consumer attempts to submit a transaction for processing. In other embodiments, transaction data may be generated and sent by the merchant system based on items added to a consumer's shopping cart. In some embodiments, transaction data may include information for a non-financial transaction (e.g., alert data, incentive data, product data, etc.). The transaction data may be in any suitable format and may include any suitable information depending on the purpose of the transaction.

Transaction data may be included in a transaction authorization message and/or a transaction clearing and settlement message. In some embodiments, the transaction data may be sent in real-time as a transaction is being performed. In some embodiments, the transaction data may be sent after a transaction has been completed or performed. In some embodiments, the transaction data may be sent to a payment processing network. In some embodiments, the transaction data may be include in exception messages or data files, related to disputes (e.g., fraud transactions and/or chargebacks).

The term "identifier" may include any information that may be used for identification. For example, the identifier may be a unique numeric (or alphanumeric) value assigned to a piece of data. In some embodiments, the merchant identifier may also be a series of alphanumeric characters, one or more graphics, a token, a bar code, a QR code, or any other information that may be used to identify a merchant. In some embodiments, the same identifier may be assigned to two or more separate pieces of data (e.g., data messages), such that when they are received by a server computer, the two or more pieces of data may be correlated to each other The term "merchant identifier" may include any information that may be used to identify a merchant. For example, the merchant identifier may be one or more of a merchant name, a merchant address, a merchant location, a merchant category code (MCC), a merchant account number, and/or another piece of data used to identify one merchant from another merchant. In some embodiments, the merchant identifier may be a card acceptor identifier (CAID), which may be a unique numeric (or alphanumeric) identifier assigned to each merchant location by an acquirer. The merchant identifier may be used to uniquely identify transactions associated with the merchant. In some embodiments, the merchant identifier may also be a series of alphanumeric characters, one or more graphics, a token, a bar code, a QR code, or any other information that may be used to identify a merchant.

In some embodiments, the merchant identifier may be used to determine whether a merchant attributes database include merchant attributes data for the merchant associated with the merchant identifier.

In some embodiments, the merchant identifier for a merchant in the form of a merchant name and a merchant category code may be used to determine rules associated with the merchant. The rules may indicate how the merchant name may be modified or transformed to generate a normalized merchant name.

The term "merchant attributes data" may include to information or data that may be associated with a merchant. Merchant attributes may include a merchant address (e.g., street address, city, state, zip code), a merchant phone number, a merchant tax identification number, a merchant category code, and ownership hierarchy. In some embodiments, the merchant attributes data for a merchant may also be used to correlate related transactions associated with the merchant. In such embodiments, as the same merchant attributes data may be applied to all transaction from the same merchant, all transactions from the same merchant may be correlated to each other.

The merchant attributes data may be retrieved from a data file (e.g., an acquirer merchant master file) sent by an acquirer computer or from third party sources. The merchant attributes data may be stored by a payment processing network server computer in a merchant attributes database. In some embodiments, the merchant attributes data received in the data file may be modified by the payment processing network server computer. In some embodiments, the merchant attributes data in the merchant attributes database may be retrieved and associated with a transaction in order to enhance the merchant data associated with the transaction.

The term "supplemental data file" may include a data file storing supplemental data. The supplemental data file may include data retrieved from an acquirer computer (e.g., an acquirer merchant master file), an issuer computer, or from a third party data source. The supplemental data file may include detailed merchant attributes data, including merchant location data (e.g., merchant address data, card acceptor identifier data, merchant location identifier) and/or additional merchant data (e.g., tax identification number, ownership data). In some embodiments, the merchant attributes data from the supplemental data file may be retrieved and associated with transaction data.

In some embodiments, the merchant attributes data from the supplemental data file may be retrieved and associated with transaction data and sent to a data analyzer computer to perform analytics on the merchant, the consumer and the transaction. In such embodiments, this may be conducted after a transaction has been completed.

In some embodiments, the merchant attributes data from the supplemental data file may be retrieved and associated with transaction data in real-time prior to the transaction data being sent to an issuer computer. This can be done to provide enhanced merchant attributes data with the transaction that may assist in the authorization for a transaction (e.g., a merchant location specific fraud score).

The term "certified data source" may refer to a data source that has been determined to satisfy predetermined standards. A certified data source may be an acquirer computer, a payment processor computer, an issuer computer, and/or a third party computer that provides merchant-related data. In some embodiments, a data source may be considered a certified data source when a percentage of previous transactions associated with a server computer (e.g., a payment processing network) that can be correctly matched to the supplemental data file exceeds a predetermined threshold.

The term "database" may include any hardware, software, firmware, or combination of the preceding for storing and facilitating the retrieval of information. In addition, the database may use any of a variety of data structures, arrangements, and compilations to store and facilitate the retrieval of information.

The term "issuer computer" may include a computer associated with an entity that issues an account. An issuer is typically a business entity (e.g. a bank) which maintains financial accounts for a plurality of users (e.g., consumers).

The term "message" may include any data or information that may be transported from one entity to another entity (e.g., one computing device to another computing device). Messages may be communicated internally between devices/components within a computer or computing system or externally between a device to a device over a communications network. Additionally, messages may be modified, altered, or otherwise changed to comprise encrypted or anonymized information.

The term "merchant attributes message" may include a message associated with a merchant. In some embodiments, the merchant attributes message may be generated and include merchant attributes data retrieved from the merchant attributes database. In such embodiments, the merchant attributes message may be associated with specific transaction data using a unique identifier. In some embodiments, where the merchant attributes are used to enrich a real-time transaction, the merchant attributes message and the transaction data may then be sent to an issuer computer and correlated using the unique identifier. In other embodiments, where the merchant attributes are used to enrich a previously performed transaction, the merchant attributes message and the transaction data may then be sent to a data analyzer computer and correlated using the unique identifier.

In some embodiments, the merchant attributes message may be a message containing transaction data. In such embodiments, the merchant attributes message and the transaction data may be sent by the payment processing network server computer to the issuer computer and/or the data analyzer computer in a single message.

The term "data normalization process" may include a process performed on at least portions of data to normalize them. In some embodiments of the present invention, a data normalization process may include normalizing or standardizing portions of data into a common form. For example, a data normalization process may be performed on merchant name data to ensure that all transactions associated with a particular merchant have a common merchant name assigned to it. A similar process may be performed on merchant location data. For example, merchant location data may be conformed to match the standards recognized by a government agency (e.g., the U.S. Postal Service).

In some embodiments, the data normalization process may also be performed to correct any inconsistencies in merchant name or merchant location data. For example, transaction data may include the merchant location data: "San Jose, Calif. 94111." However, the zip code "94111" is assigned to San Francisco, Calif. In such a situation, the data normalization process may determine that the merchant location data should be "San Francisco, Calif. 94111." The data normalization process may be performed based on a series of predefined rules.

The term "notification message" may include a type of data message that indicates a discrepancy between data in a database and other data. In some embodiments of the present invention, an notification message may be sent by the payment processing network server computer to a data source (e.g., an acquirer computer). The notification message may include information indicating that one or more merchants that could not be cross-referenced with merchant attributes data stored in the merchant attributes database. In such embodiments, the notification message may provide an indication to the data source to seek out additional information to obtain merchant data and merchant attributes data for the one or more merchants that could be not cross-referenced.

The term "user" may include an individual or entity. The user may be a consumer or business entity who is associated with a financial account and whose financial account can be used to conduct financial transactions using a user computing device (e.g., a mobile device) associated with the financial account.

The term "fraud trend" may include a pattern of fraud. A fraud trend may be determined based on an evaluation of previous transactions involving a merchant, a consumer, and/or any other party to a transaction. For example, based on correlating all transaction associated with a merchant (e.g., by performing a merchant name normalization or by associating merchant attributes data with transaction data), a pattern of fraud may be determined (e.g., large number of chargebacks, repetitive orders). For example, a spike in the number of chargebacks being processed for a merchant may be indicative that there are fraud-related issues with the merchant. In some embodiments, the fraud trend may not be a readily apparent when the transactions associated with a merchant are not correlated with each other.

The term "authorization process" may include a process for authorizing a transaction. In some embodiments, an authorization process involves a payment processing network and an issuer computer associated with a payment account or payment device. The authorization process may involve the generation and sending of authorization request messages to an issuer computer to authorize a financial transaction involving a consumer account issued by the issuer, and an authorization response message from the issuer computer indicating an authorization or rejection of the transaction.

The term "data analyzer computer" may include a computer configured to analyze data. The data analyzer computer may be configured to receive and store rules and capture rate statistics generated by the payment processing network. The data analyzer computer may use the data received from the payment processing network to conduct analysis of merchants, consumers, and transactions. In some embodiments, the data analyzer computer may further be configured to receive and store merchant data (e.g., information regarding merchants that were not located in the supplemental data file received from the acquirer computer.

The term "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

The term "payment processing network" may include a network that includes or operates at least one server computer used for payment processing. In some embodiments, the server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers. In some embodiments, the payment processing network may operate multiple server computers. In such embodiments, each server computer may be configured to process transaction for a given region or handles transactions of a specific type based on transaction data. The server computer may be referred to as a "payment processing server."

The payment processing network may include data processing subsystems, networks, and operations used to support and deliver authorization services, exception file services, and clearing and settlement services. An exemplary payment processing network may include VisaNet™. Networks that include VisaNet™ are able to process credit card transactions, debit card transactions, and other types of commercial transactions. VisaNet™, in particular, includes an integrated payments system (Integrated Payments system) which processes authorization requests and a Base II system, which performs clearing and settlement services. The payment processing network may use any suitable wired or wireless network, including the Internet.

The payment processing network may process transaction request messages and determine the appropriate destination (e.g., issuer computer) for the transaction request messages. The payment processing network may also handle and/or facilitate the clearing and settlement of transactions.

I. EXEMPLARY SYSTEM

FIG. 1A shows a transaction processing system 100 according to an embodiment of the present invention. The system 100 may be used to facilitate data communications between a user computing device 102 and a payment processing network 108. The system 100 may include traditional transaction-related entities including a merchant computer 104, an acquirer computer 106, the payment processing network 108, an issuer computer 110, a data analyzer computer 112, a payment device 114, and an access device 116. Each of these systems and computers may be in operative communication with each other.

For simplicity of illustration, a certain number of components are shown is shown in FIG. 1A. It is understood, however, that embodiments of the invention may include more than one of each component. In addition, some embodiments of the invention may include fewer than all of the components shown in FIG. 1A. In addition, the components in FIG. 1A may communicate via any suitable communication medium (including the Internet), using any suitable communications protocol.

The user computing device 102 may be in any suitable form. For example, suitable user computing devices 102 can be hand-held and compact so that they can fit into a consumer's pocket (e.g., pocket-sized). The user computing device 102 can include a processor, and memory, input devices, and output devices, operatively coupled to the processor. Specific examples of portable consumer devices include cellular or wireless phones, personal digital assistants (PDAs), pagers, portable computers, smart cards, and the like.

The merchant computer 104 may be comprised of various modules that may be embodied by computer code, residing on computer readable media. The merchant computer 104 may include a processor and a computer readable medium coupled to the processor, the computer readable medium comprising code, executable by the processor for performing the functionality described below. Examples of merchant computers 104 may include an access device, point of sale terminal, or a server computer hosting a merchant Internet website. The merchant computer 104 may be in any suitable form. Additional examples of merchant computers include any device capable of accessing the Internet, such as a personal computer, cellular or wireless phones, personal digital assistants (PDAs), tablet PCs, and handheld specialized readers. The merchant computer 104 may transmit data through a communications medium to an acquirer computer 106. In some embodiments of the invention, the merchant computer 120 receives transaction data from a user computing device 102 and transmits the transaction data to the acquirer computer 106 for fraud transaction-related processes (e.g., authentication, authorization).

The acquirer computer 106 is typically a system associated with an entity (e.g. a bank) that has a business relationship with a particular merchant or other entity.

The acquirer computer 106 may include a processor and a computer readable medium coupled to the processor, the computer readable medium comprising code, executable by the processor for performing the functionality described below.

The acquirer computer 106 may include a database 106a storing merchant data for merchants associated with the acquirer computer 106. The acquirer data file database 106a may include merchant attributes data, such as detailed merchant location data and a card acceptor identifier. A supplemental data filed (e.g., an acquirer data file) may be sent from the acquirer computer 106 to the payment processing network 108.

The issuer computer 110 is typically a system associated with an entity (e.g. a bank) which maintains financial accounts for the consumer and often issues a consumer payment device, such as a credit or debit card to the consumer. The issuer computer 110 may include a processor and a computer readable medium coupled to the processor, the computer readable medium comprising code, executable by the processor for performing the functionality described below. Some entities can perform both issuer computer 110 and acquirer computer 106 functions. Embodiments of the invention encompass such single entity issuer-acquirers.

Figure 1B:
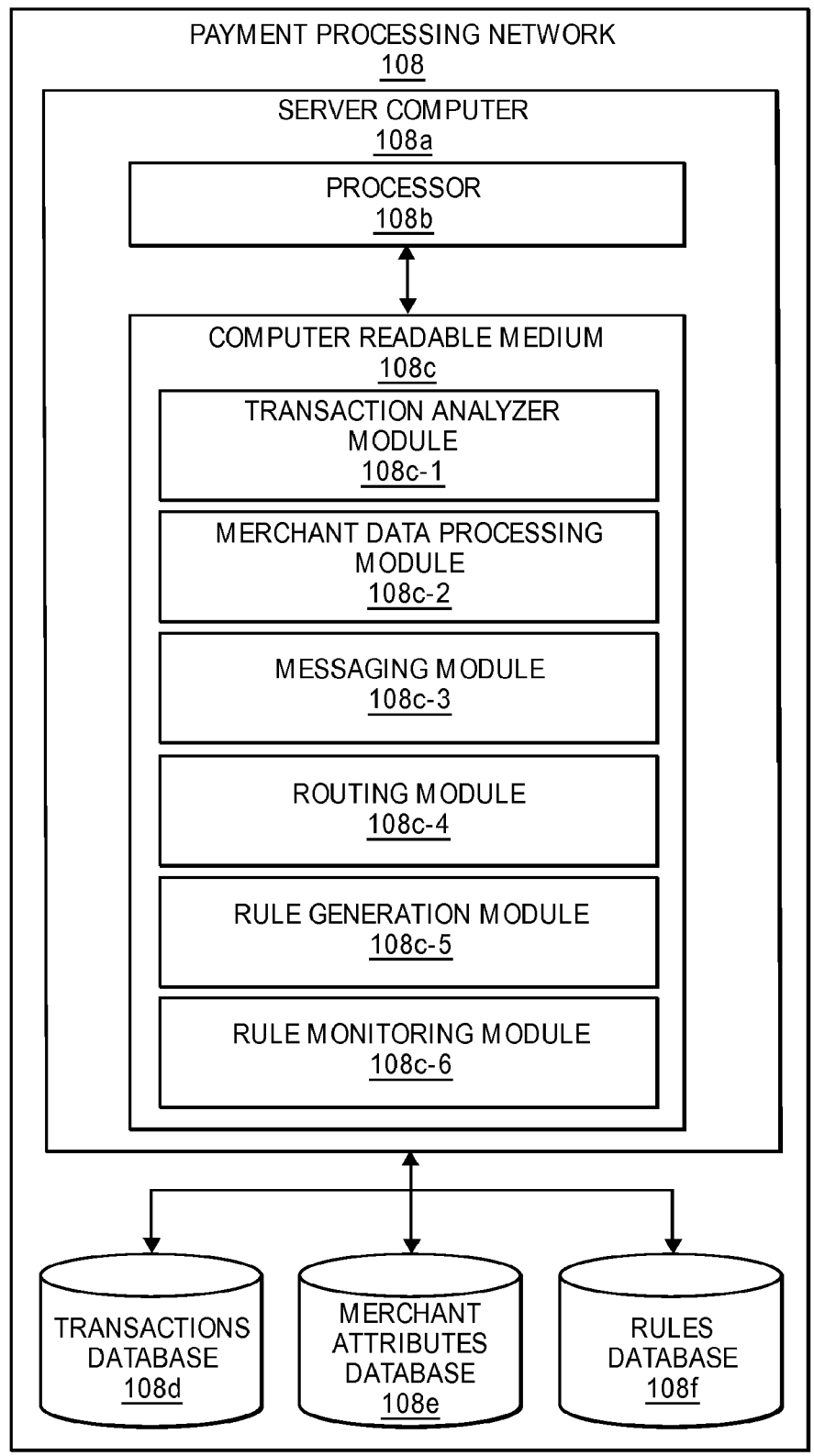
FIG. 1B depicts an exemplary block diagram of a payment processing network computer according to an embodiment of the present invention.

FIG. 1B depicts an exemplary block diagram of a payment processing network computer according to an embodiment of the present invention. The payment processing network 108 may comprise a server computer 108a comprising a processor 108b and computer readable medium 108c coupled to the processor 108b, the computer readable medium 108c comprising code, executable by the processor 108b for performing the functionality described below. The computer readable medium 108c may store one or more modules, including a transaction analyzer module 108c-1, a merchant data processing module 108c-2, a messaging module 108c-3, a routing module 108c-4, a rule generation module 108c-5, and a rule monitoring module 108c-6. The various modules may be embodied by computer code, residing on computer readable media.

As noted above, the payment processing network 108 may have or operate at least a server computer 108a. In some embodiments, the server computer 108a may be coupled to a database and may include any hardware, software, other logic, or combination of the preceding for servicing the requests from one or more client computers. The server computer 108a may be operably connected to a transaction database 108d, a merchant attributes database 108e, and a rules database 108f. Some embodiments of the invention may include fewer than all of the components and modules shown in FIG. 1B.

The server computer 108a may comprise one or more computational apparatuses and may use any of a variety of computing structures, arrangements, and compilations for servicing the requests from one or more client computers.

The payment processing network 108 may include data processing subsystems, networks, and operations used to support and deliver authorization services, exception file services, and clearing and settlement services. An exemplary payment processing network may include VisaNet™. Networks that include VisaNet™ are able to process credit card transactions, debit card transactions, and other types of commercial transactions. VisaNet™, in particular, includes an integrated payments system that processes authorization requests and a Base II system that performs clearing and settlement services. The payment processing network 108 may use any suitable wired or wireless network, including the Internet.

The transaction analyzer module 108c-1 may comprise code for analyzing transaction data received by the payment processing network 108. The transaction analyzer module 108c-1 and the processor 108b may analyze transaction data to determine whether a merchant identifier (e.g., a card acceptor identifier) associated with the transaction matches to merchant data stored in a merchant attributes database 108e. An exemplary process of determining whether the merchant identifier matches merchant data is described below with respect to FIGS. 7 and 8.

The merchant data processing module 108c-2 may comprise code for processing merchant data and merchant attributes data. In some embodiments, the merchant data processing module 108c-2 may comprise code for analyzing merchant name and merchant location data. In such embodiments, the merchant data processing module 108c-2 may also comprise code for normalizing the merchant name and merchant location data associated with a merchant.

In some embodiments, the merchant data processing module 108c-2 may comprise code for analyzing merchant data received by the payment processing network 108 in a data file. The data file may be from the acquirer computer 106. In such embodiments, the merchant data processing module 108c-2 and the processor 108b may analyze merchant data against a set of previous transactions stored by the payment processing network 108. The merchant data processing module 108c-2 may comprise code for determining the number of transactions that can be correlated to a specific merchant in the data file.

The messaging module 108c-3 may comprise code for sending and receiving messages to and from the server computer 108a in the payment processing network 108. In some embodiments, the messaging module 108c-3 and the processor 108b may be configured to receive transaction data from the acquirer computer 106 and send the transaction data to the data analyzer computer 112. In some embodiments, the messaging module 108c-3 may comprise code for receiving transaction data from the acquirer computer 106 and sending the transaction data to the issuer computer 110.

The messaging module 108c-3 may comprise code for generating messages to be sent to the acquirer computer 106, the issuer computer 110, and/or the data analyzer computer 112. In some embodiments, the messaging module 108c-3 and the processor 108b may generate a separate merchant attributes message including one or more of the merchant attributes retrieved from the merchant attributes database 108e. The messaging module 108c-3 and the processor 108b may associate the merchant attributes message with the transaction data using a unique identifier. In other embodiments, the messaging module 108c-3 and the processor 108b may modify the transaction data to include one or more of the merchant attributes from the merchant attributes database 108e.

The routing module 108c-4 and the processor 108b may be configured to perform the routing of transaction data between the acquirer computer 106 to the issuer computer 110. These messages may include authentication request/response messages and transaction authorization request/response message.

The rule generation module 108c-5 may comprise code for generating rules for normalizing merchant name and merchant location data received as transaction data or from data received from a remote server computer (e.g., the acquirer computer 106, the issuer computer 100, and/or third party data sources). The rule generation module 108c-5 may also be configured to generate rules for cross-referencing a set of transactions stored in the transactions database 108d with a merchant identifier received from a remote server computer (e.g., the acquirer computer 110.

In some embodiments, the rule monitoring module 108c-6 may comprise code for monitoring previously generated rules to detect any changes in the triggering of the rules (e.g., changes in number of transactions triggering a rule). In such embodiments, the rule monitoring module 108c-6 and the processor 108b may be able to detect changes that require modifications to a rule (e.g., a large reduction in the number of transactions triggered may indicate that a merchant name has been modified by an acquirer or by another party). When the rule monitoring module 108c-6 and the processor 108b detect a change that requires modifications a previously generated rule, the rule generation module 108c-5 and the processor 108b may receive data indicating the required change to the rule and perform a rule modification.

The transactions database 108d may be a database storing information and data related to past transaction. In some embodiments, the transaction database 108d may store data in a plurality of categories, including transaction identifier (e.g., an order number, a transaction number, or any other unique value assigned to a transaction by a merchant, acquirer, issuer or payment processing network to uniquely identify the transaction), transaction amount, transaction time, issuer identifier, user identifier, merchant identifier, location identifier, geo-coordinates, device identifier, and acquirer identifier. The transactions database 108d may be organized by transaction identifier. Each transaction identifier may have a separate row composed of data associated with the transaction identifier. Some embodiments may have fewer or additional categories for data.

The merchant attributes database 108e may be a database storing merchant attributes. The merchant attributes database 108e may store merchant data and merchant attributes received from the acquirer computer 106, the issuer computer 110, and/or from third party sources. The merchant data and merchant attributes may be stored in a tabular data structure, in a text file, or by any other storage means as would be understood by one of ordinary skill in the art. An example table of merchant attributes data 600 is depicted in FIG. 6, and is discussed further with respect to the method of FIG. 8.

The rules database 108f may be a database configured to store rules. The rules stored in the rules database 108f may be derived from prior transaction data. In some embodiments, the rules stored in the rules database 108f may include rules for normalizing merchant name and/or merchant location data. In some embodiments, the rules stored in the rules database 108f may include rules for matching transactions to a merchant identifier (e.g., a card acceptor identifier).

Returning to FIG. 1A, the data analyzer computer 112 may comprise a server computer comprising a processor and computer readable medium coupled to the processor, the computer readable medium 106c comprising code, executable by the processor for performing the functionality described below. The data analyzer computer 112 may be configured to receive and store rules and capture rate statistics generated by the payment processing network 108. The data analyzer computer 112 may use the data received from the payment processing network 108 to conduct analysis of merchants, consumers, and transactions. In some embodiments, the data analyzer computer 112 may further be configured to receive and store merchant data provided by the payment processing network. This merchant data may include data relating to merchants that could not be located in the acquirer data file received from the acquirer computer 106.

The payment device 114 may be a device that may be used to conduct a transaction. Suitable payment devices 114 can be hand-held and compact so that it can fit into a user's wallet and/or pocket (e.g., pocket-sized). The payment devices 114 can include a processor, and memory, input devices, and output devices, operatively coupled to the processor. Specific examples of payment devices 114 include debit devices (e.g., a debit card), credit devices (e.g., a credit card), or stored value devices (e.g., a prepaid or stored value card with a value that may only be used at a specific merchant or collection of merchants). In some embodiments, the payment device 114 can be cellular or wireless phones, personal digital assistants (PDAs), pagers, tablet computers, portable computers, smart cards, and the like. In some embodiments, a magnetic stripe portion may be embedded on the payment device 114, containing data associated with financial accounts. In some embodiments, an account number may be imprinted on the body of the payment device 114.

The access device 116 may be device that can initiate a transaction between a user and a merchant. In some embodiments, the access device 116 may be a device that can interact with a payment device 114 (e.g., a payment card) during a transaction. In embodiments of the invention, the access device can receive payment device data from the payment device 114 and transmit the payment device data to the merchant computer 104 associated with the access device 116. The access device 116 can be in any suitable form. Examples of access devices 116 include point of sale (POS) devices, cellular phones, PDAs, personal computers (PCs), tablet PCs, handheld specialized readers, set-top boxes, electronic cash registers, automated teller machines (ATMs), virtual cash registers, kiosks, access systems, and the like. In some embodiments, where the access device 116 is a point of sale terminal, suitable point of sale terminal may be used including payment device or phone readers. The payment device or phone readers may include any suitable contact or contactless mode of operation. For example, exemplary readers can include RF (radio frequency) antennas, magnetic stripe readers, etc. to interact with the payment device 114.

II. EXEMPLARY METHODS

Merchant Name Normalization

FIG. 3A shows an exemplary merchant name table 300 depicting merchant name data according to an embodiment of the present invention. The merchant name table 300 depicts the process of transforming and modifying the raw merchant name data that may be received as part of transaction data. In some embodiments of the present invention, a merchant data processing module 108c-2 in the payment processing network server computer 108a and the processor 108b may perform the process of transforming and modifying the raw merchant name so that it is normalized.

The merchant name table 300, as depicted in FIG. 3A, includes entries for "Raw Merchant Name" 302, "Descriptor Merchant Name" 304, "Parsed Merchant Name" 306, "Normalized Merchant Name" 308, "Doing Business As (DBA)" 310, and "Merchant Corporate Name" 312.

The "Raw Merchant Name" 302 may be the merchant name data received directly from an acquirer computer 106 or other data source as part of transaction data. Using the second example in FIG. 3A, the raw merchant name may be "Motel Five Exprss #34 A213" 302a. The "#34" may indicate a specific merchant location, and the "A213" may be related to a specific transaction occurring at merchant location #34.

The "Descriptor Merchant Name" 304 may be the merchant name data after non-merchant information has been removed from the raw merchant name by the merchant data processing module 108c-2 and the processor 108b. Non-merchant information may include transaction number data, ticket number data, cardholder data, and/or any other data that may be used to identify a specific transaction. Continuing the example above, the descriptor merchant name may be transformed from Motel Five Exprss #34 A213" 302a to "Motel Five Exprss #34" 304a with the specific transaction-related portion (e.g., "A213") removed.

The "Parsed Merchant Name" 306 may be the merchant name data after store or location-specific information has been removed from the descriptor merchant name by the merchant data processing module 108c-2 and the processor 108b. The parsed merchant name for the example in FIG. 3A may be modified from "Motel Five Exprss #34" 304a to "Motel Five Exprss" 306a with the specific merchant location-related portion (e.g., "#34") removed.

The "Normalized Merchant Name" 308 may be the merchant name data after corrections or modifications to the spelling and/or grammar of the merchant name has been performed by the merchant data processing module 108c-2 and the processor 108b. The normalized merchant name may also maintain the information indicating different venues or subsidiaries related to a single DBA or corporate entity. For example, the normalized merchant names are maintained as "Big Box" and "Big Box Outlet", as shown in FIG. 3A, which are subsidiaries of the Big Box Corporation. In some embodiments, the normalized merchant name data may be consistent across all instances of transactions involving a specific merchant. Continuing the example above, the merchant data processing module 108c-2 and the processor 108b may correct any misspellings in the merchant name and transform "Motel Five Exprss" 306a to "Motel 5 Express" 308a.

The "Doing Business As (DBA)" 310 may be the merchant name data that is used to consolidate alternative business entities associated with the merchant. For example, a merchant may have one or more of an internet website, a catalog, an outlet/factory/discount stores and/or other ventures (e.g., subsidiaries, holding companies). For example, the DBA name for the example may be "Motel 5". Motel 5 Express may be a discount chain of hotels associated with Motel 5.

The "Merchant Corporate Name" 312 may be the merchant name data indicating the corporate name under which the merchant associated with the transaction operates. The merchant corporate name may be "Hotels, Inc.", which may be the corporation that owns Motel 5, Motel 5 Express, etc.

In some embodiments, the process of transforming/modifying the raw merchant name may be performed by the merchant data processing module 108c-2 and the processor 108b based on a series of rules stored in the rules database 108f. The rules may be based on prior transaction data associated with the merchant. In some embodiments, the rules may be customizable by a user.

Rule Generation and Monitoring

In order to transform the raw merchant name into a standard DBA or merchant corporate name, rules may be applied to merchant data. In some embodiments, the rules may be generated by the rule generation module 108c-5 and the processor 108b and stored in the rules database 108f.

A first step in generating a set of rules for merchant name transformation/modification may be to define a search query. For example, in order to generate a rule for "ABC's Cafe", a search query may be run for the text string, "ABC", in order to capture possible variations (e.g., "ABC's Cafe", "ABCs' Cafe", "ABCs Cafe"). The search query may be run on a set of prior transactions processed by the payment processing network 108 and stored in the transactions database 108d. In some embodiments, the set of prior transactions retrieved from the transactions database 108d may be the transactions performed over the previous 90 days. In other embodiments, the set of prior transactions retrieved from the transactions database 108*d* may be for a different period with the length of the period customizable by a user or predefined by the system.

The result of the search query may include a plurality of matching results and a plurality of non-matching results. For example, "ABCD Cafe", "ABCz Cafe" and "ABC Books" may all be returned as a result of the search query for the text string: "ABC".

A prototype set of rules may then be generated based on the matching results from the search query. The prototype rules may be user-defined. In some embodiments, the prototype rules may be automatically generated by the rule generation module 108*c*-5 and the processor 108*b* based on pre-existing rules and/or via machine learning.

The prototype set of rules may then be validated by the rule generation module 108*c*-5 and the processor 108*b*. The rules may be validated by checking the syntax of the rules, determining whether the rules are duplicative, and applying the prototype rules to the set of prior transactions to determine whether the rules are over-capturing or under-capturing transactions. The prototype set of rules may then be applied to a simulation of an extended period of production data (e.g., two weeks of transaction data) to determine whether the rules may be over-capturing or under-capturing transactions.

After the set of rules are put into production (e.g., applied to live transactions), a rule monitoring module 108*c*-6 and the processor 108*b* may to monitor the rules. For example, the rule monitoring module 108*c*-6 and the processor 108*b* may monitor the rules to detect any change in transaction volume. For example, Merchant A's transaction volume may be: Day 1 had 534 transactions, Day 2 had 478 transactions, Day 3 had 549 transactions, and Day 4 had zero transactions. The change from Day 3 to Day 4 may be an indication that there has been a deviation from the normal pattern for Merchant A. In some situations, the merchant's name may have been changed by the acquirer computer 106 and the set of rules may not apply correctly to the new name of the merchant. The rules may be then be modified by the rule generation module 108*c*-5 and the processor 108*b* to cover the new name of the merchant.

FIG. 3B shows a table illustrating an exemplary application of rules to merchant name data according to an embodiment of the present invention.

In some embodiments of the present invention, the merchant data processing module 108*c*-2 and the processor 108*b* may retrieve a string of characters of a merchant name from the transaction data. Using the first row of data in table 350 in FIG. 3B, the merchant data processing module 108*c*-2 and the processor 108*b* may retrieve "ABC's Café #1003" 352*a*. The merchant data processing module 108*c*-2 and the processor 108*b* may evaluate the string of characters with a set of rules. The set of rules may be determined based on a merchant identifier associated with the merchant. The merchant data processing module 108*c*-2 and the processor 108*b* may determine a modified merchant name for the merchant based on the set of rules, and associate the modified merchant name with the transaction data.

For example, continuing with the first row of data in table 350 in FIG. 3B, the raw merchant name 352 is given as "ABC's Cafe #1003" 352*a* and the merchant category code (MCC) 354 is "5812" 354*a* from transaction data retrieved from an acquirer computer 106. In such embodiments, the raw merchant name 352 and a merchant category code 354 may be a merchant identifier used to determine rules associated with the merchant. The rules may indicate how the raw merchant name may be modified or transformed to generate a normalized merchant name 372.

The merchant data processing module 108*c*-2 and the processor 108*b* may access the rules database 108*f* to determine the rule or rules applicable to the merchant identifier retrieved from the transaction data. For example, a predefined rule may state that if positions 1-12 of the raw merchant name 352 include the characters "ABC's Cafe #" and the merchant category code 354 is "5812", the descriptor merchant name 358 is equal to the raw merchant name 352 (e.g., "ABC's Cafe #1003" 352*a*). The parsed merchant name 360 may be based on positions 1-10 and the merchant data processing module 108*c*-2 and the processor 108*b* may remove the merchant location-specific data (e.g., "#1003"). The rules may further indicate that the normalized merchant name 362 and the doing business as (DBA) name 364 for "ABC's Cafe" 360*a* should be "ABCs Cafe and Lounge" 364*a*, and the merchant corporate name should be "The Restaurant Group" 366*a*.

A similar process may be applied to the second and third rows of data in FIG. 3B. The rules applied to the second and third rows may be different based on the rule generation process described earlier. For example, a first acquirer computer may have the raw merchant name 352 as "ABCs Cafe" 352*b*, omitting the apostrophe, while a second acquirer computer may have misspelled the raw merchant name 352 as "ABCz Cafe" 352*c*.

Using the second row of data in FIG. 3B, a predefined rule may state that if positions 1-11 of the raw merchant name 352 include the characters "ABCs Cafe #" and the MCC 354 is "5812" 354*b*, the descriptor merchant name 358 is equal to the raw merchant name 352 (e.g., "ABCs Cafe #5305" 352*b*). A different rule may state that if positions 1-11 of the raw merchant name 352 include the characters "ABCz Cafe #" and the MCC 354 is "5812" 354*c*, the parsed merchant name 360 is equal to "ABCs Cafe #" 360*c*. The rules may further indicate that the normalized merchant name 362 and the doing business as (DBA) name 364 for "ABCz Cafe" 360*c* should be "ABCs Cafe and Lounge" 364*c*, and the merchant corporate name 366 should be "The Restaurant Group" 366*c*.

Merchant Location Normalization

FIG. 4 shows an exemplary merchant location table 400 depicting merchant location data according to an embodiment of the present invention. The merchant location table 400 depicts the modification of raw merchant location data that may be received as part of transaction data to the normalized merchant location data that may be used to enhance transaction data. In the example shown in FIG. 4, the city, state/province, zip code, and country data associated with a transaction are shown.

The merchant data processing module 108*c*-2 and the processor 108*b* may process the merchant location data retrieved from transaction data associated with a transaction. The merchant data processing module 108*c*-2 and the processor 108*b* may perform a data normalization process on the merchant location data. During the data normalization process, when the merchant data processing module 108*c*-2 and the processor 108*b* determines that one or more elements of the merchant location data do not correlate with each other, the merchant data processing module 108*c*-2 and the processor 108*b* may determine modifications to the one or more elements of the merchant location. Based on the modifications, the merchant data processing module 108*c*-2 and the processor 108*b* may generate a modified merchant location. The data normalization process may be performed using a set of predefined rules and using standards recognized by a government agency (e.g., the U.S. Postal Service) or another source.

In some embodiments, the city data, state data and zip code data may be evaluated against each other to determine whether the raw merchant location data is accurate. For example, using the first row of merchant location data in FIG. 4, the merchant data processing module 108c-2 and the processor 108b may evaluate the data based several different comparisons using the data: (1) is Salt Lake City in Utah?; (2) is zip code 84120 in Utah?; and (3) is zip code 84120 in Salt Lake City? When the city, state and zip correlate with each other, the merchant data processing module 108c-2 and the processor 108b may not need to perform any additional processing.

Using the third row of merchant location data in FIG. 4, the raw merchant location data is "Salt Lake Ci", "UT" and "84101." In this example, "Salt Lake Ci" may not be a recognized United States Postal service abbreviation. The merchant data processing module 108c-2 may determine whether the remaining data pieces (e.g. the state and the zip code) are internally consistent. The merchant data processing module 108c-2 in the payment processing network 108 may evaluate whether: (1) is Salt Lake Ci in Utah?; (2) is zip code 84101 in Utah?; and (3) is zip code 84120 in Salt Lake Ci? In this scenario, only the second evaluation may provide a positive response as "Salt Lake Ci" may not be recognized. In this situation, as the zip code and the state correlate with each but, but neither the zip code nor the state correlates with the city, the city data may be modified from "Salt Lake Ci" to "Salt Lake City", as "Salt Lake City" is the primary city associated with zip code 84101.

In some embodiments, when the city, state and zip code all do not agree with each other, the merchant data processing module 108c-2 may use the zip code as the default. For example, in the sixth row of merchant location data in FIG. 4, the raw merchant location data is "Salt Lake Cty", "HI" and "15258." The merchant data processing module 108c-2 in the payment processing network 108 may evaluate whether: (1) is Salt Lake Cty in Hawaii?; (2) is zip code 15258 in Hawaii?; and (3) is zip code 15258 in Salt Lake Cty? In this scenario, none of the evaluations will return a positive result. However, as 15258 is the zip code for Pittsburgh, Pa., the merchant location data may be normalized to "Pittsburgh, Pa. 15258."

Associating Merchant Attributes With a Transaction

Figure 7:
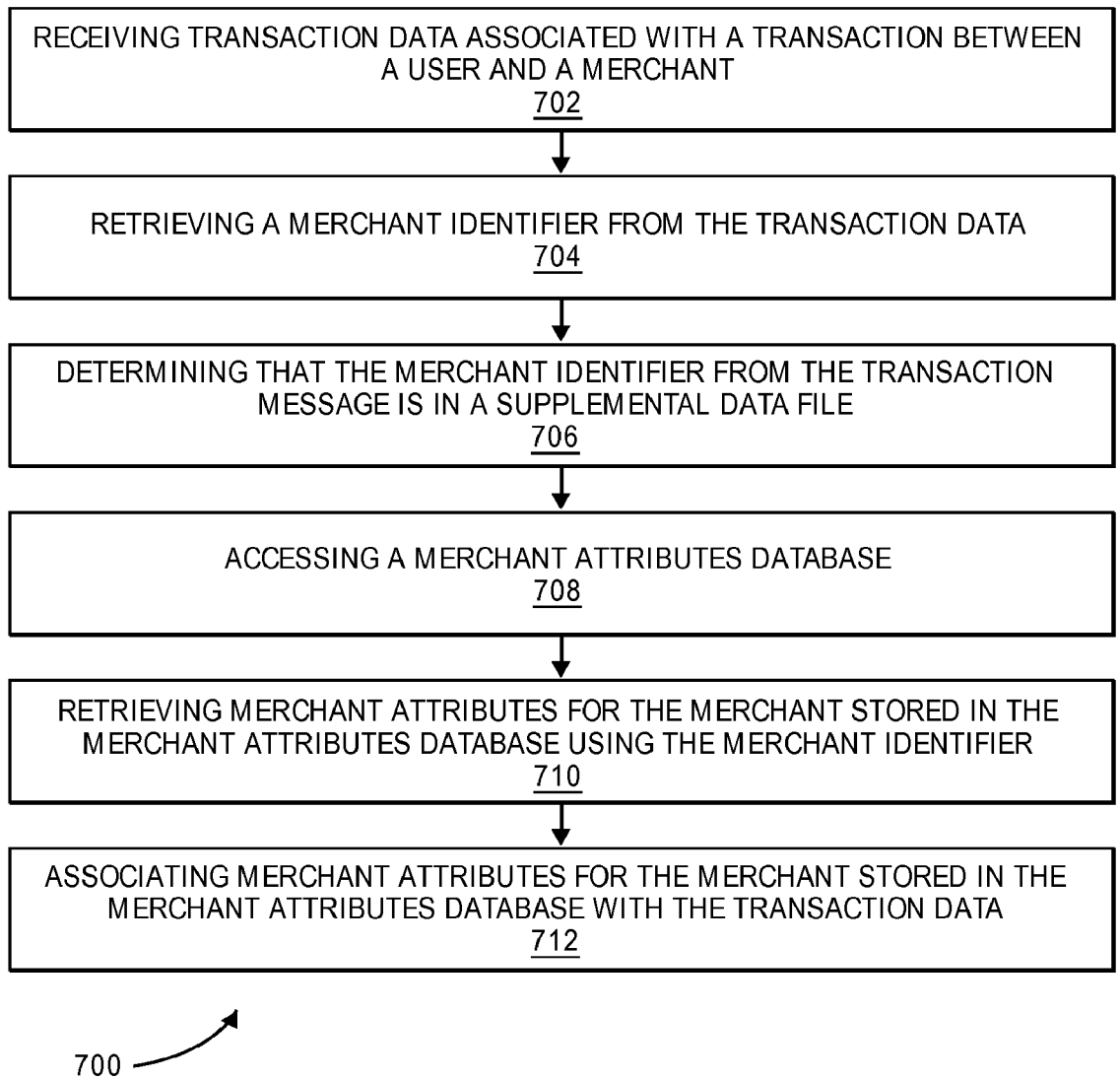
FIG. 7 shows a flowchart describing an exemplary method of associating merchant attributes stored at a payment processing network with transaction data according to an embodiment of the present invention.

FIG. 7 shows a flowchart 800 describing an exemplary method of associating merchant attributes stored at a payment processing network with transaction data according to an embodiment of the present invention.

In step 702, a server computer 108a in the payment processing network 108 receives transaction data associated with a transaction between a user and a merchant. The transaction data may be related to a transaction that has been previously performed and/or completed. The transaction data may be an authorization message related to the transaction and/or a clearing and settlement message related to the transaction. The transaction data may include one or more of transaction-specific data (e.g., transaction amount), user data (e.g., user payment data, user contact data, user computing device data), merchant data (e.g., merchant location data, card acceptor identifier).

In some embodiments, the transaction may have been initiated by the user accessing a merchant website hosted on a merchant computer 104 using a user computing device 102 (e.g., a mobile device). The user may access the merchant's website using an internet browser application stored on a memory in the user computing device 102. Once the user has selected goods or services via the merchant's website, the user may proceed through a checkout process. In other embodiments, the user may swipe or pass the user computing device 102 or payment device 114 through or in proximity to an access device 116 associated with the merchant computer 104. The latter transaction may be a transaction that is performed at a physical point of sale.

In step 704, the server computer 108a may retrieve a merchant identifier from the transaction data. The server computer 108a may evaluate the transaction data and retrieve at least the merchant identifier. In some embodiments, the merchant identifier may be a merchant name and/or a merchant category code (MCC) associated with the transaction. For example, the merchant identifier for ABC's Cafe may be the merchant's raw name (e.g., ABC's Café #1003") and the MCC (e.g., "5812"), as illustrated in the first two columns of FIG. 3B.

In some embodiments, the merchant identifier may be the card acceptor identifier (CAID) associated with the merchant. In some embodiments, the card acceptor identifier may be a unique numeric identifier assigned to each merchant location by an acquirer. In some embodiments, the card acceptor identifier may be 1-15 characters in length. In other embodiments, the card acceptor identifier may be shorter or longer.

In step 706, the server computer 108a may determine whether the merchant identifier from the transaction data is in a supplemental data file stored in the merchant attributes database 108e. The supplemental data file stored in the merchant attributes database 108e may include merchant attributes for the merchant. The merchant attributes stored in the merchant attributes database 108e may have been received from an acquirer computer 106.

A transaction analyzer module 108c-1 and the processor 108b may analyze the merchant identifier retrieved from the transaction data to determine whether the supplemental data file stored in the merchant attributes database 108e includes merchant attributes for the merchant associated with the merchant identifier.

In some embodiments, when the merchant identifier retrieved from the transaction data is not associated with merchant data stored in the merchant attributes database 108e, the merchant data processing module 108c-2 and the processor 108b may normalize the merchant name and merchant location included in the transaction data. Examples and descriptions of the merchant name and merchant location normalization process were described previously with respect to FIGS. 2 and 4.

In step 708, the server computer 108a may access the merchant attributes database 108e, the merchant attributes database 108e including the merchant attributes for the merchant associated with the merchant identifier.

In some embodiments, the merchant attributes may have been provided by the acquirer computer 106, an issuer computer 110 and/or from other third party sources (e.g., LexisNexis®, Dun & Bradstreet®). The merchant attributes may include merchant data associated with the merchant identifier. The merchant attributes may include a street address associated with a specific merchant location associated with the transaction data. Additional data included in the merchant attributes database 108e may include a primary merchant category code, a merchant phone number, a merchant tax identifier number, merchant ownership data (e.g., the merchant is minority-owned), foreign business identification numbers, etc.

In step 710, the server computer 108a may retrieve the merchant attributes for the merchant stored in the merchant attributes database 108e using the merchant identifier. The merchant attributes may be retrieved based on the merchant identifier directly or by cross-referencing the merchant identifier with a key field stored in the merchant attributes database. In some embodiments, the merchant attributes may be stored in a table.

FIG. 6 depicts an exemplary table of merchant attributes data 600 stored in the merchant attributes database 108e according to an embodiment of the present invention. In the embodiment depicted in FIG. 6, the merchant attributes are stored in the table of merchant attributes data 600. As shown, the table of merchant attributes data 600 may include fields for a "Key Field" 602, "Data Type" 604, "Acquirer File Data" 606, "Modified Acquirer File Data" 608, "Third Party Data" 610, "Primary Merchant Attribute" 612, and "Reserved" 614. In some embodiments, the table of merchant attributes data 600 may include fewer or additional fields than those depicted in FIG. 6. Additional fields may include merchant-supplied data, region-specific data, and specific fields for additional sources of data. In other embodiments, merchant attributes may be stored by other means besides a table.

The "Key Field" 602 may store keys which may be a numeric, alphanumeric, or other identifier associated with each entry in the table of merchant attributes data 600. In some embodiments, the value in the "Key Field" 602 may correspond to the merchant identifier associated with the merchant. In other embodiments, the value in the "Key Field" 602 is a unique identifier that may be cross-referenced using the merchant identifier.

The value in the "Key Field" 602 may be based on data from the supplemental data file. In some embodiments of the present invention, the value in the "Key Field" 602 may be based on a combination of an acquirer bank identification number, a payment processor identifier, and a merchant location identifier assigned by the acquirer computer 106. In other embodiments, the value in the "Key Field" 602 may be sequentially assigned to merchant attributes data based on its addition to the merchant attributes database 108e.

The "Data Type" field 604 may include the type of merchant attributes data associated with the merchant. For example, data types may include merchant address, merchant name, merchant corporate name, etc. In some embodiments, a key field may be associated with a plurality of data types. For example, as shown in FIG. 6, Key Field 849556598 may include entries in the table of merchant attributes data 600 for "Merchant Name", "Merchant Address", and "Merchant Corporate Name."

The "Acquirer File Data" field 606 may include raw data received from an acquirer (e.g., via an acquirer merchant master file). For example, the raw data may include merchant address (e.g., street, city, zip), merchant name, merchant corporate name, merchant ownership data (e.g., ownership hierarchy, minority-owned status).

The "Modified Acquirer File Data" field 608 may include the raw data received from the acquirer or may be a modified version of the raw data. The modified version of the raw data may be generated to correct any errors in the raw data (e.g., incorrect street designation, incorrect zip code). In some embodiments, when the raw data does not need to be modified, the "Modified Acquirer File Data" field 606 may be left blank.

The "Third Party Data" field 610 may include merchant data received from third party sources (e.g., LexisNexis®, Dun & Bradstreet®, Equifax, Hoover's™, Moody's).

The "Primary Merchant Attribute" field 611 may include the merchant data that is the most accurate data to associate with the transaction data. In some embodiments, the data in the table of merchant attributes data 600 may be of varying quality. The "Primary Merchant Attribute" field 610 may hold the merchant attributes data that is most reliable and/or the highest quality data.

For example, for key field "563476524" 602a in FIG. 6, the raw value from the "Acquirer Data File" 606 associated with the "Merchant Address" Data Type 604a may be "123 Main Blvd., San Francisco, Calif., 94111" 606a The raw value may be enriched and modified to correct the street designation to "123 Main St., San Francisco, Calif., 94111" 608a, and stored in the "Modified Acquirer Data File" 608 column. The third party data may be stored in the "Third Party Data" 610 column as "123 Main St., Daly City, Calif., 94111" 610a. The "Primary Merchant Attribute" 612 may include the best form of the address, "123 Main St., San Francisco, Calif., 94111" 612a Using the merchant, "Big Box Outlet—SF", stored under key field "849556598" 602b in FIG. 6, described previously with respect to FIG. 2, while the acquirer file data 606 may include the merchant name as "Big Box Outlet—SF" 606b, the acquirer data file entry may be modified to "Big Box" 608b and stored in the "Modified Acquirer File Data" field 608. The "Primary Merchant Attribute" field 611 may also store "Big Box" 612b as the preferred merchant attributes data related to the merchant name. Thus, while in FIG. 2, each system may have different merchant names for the same merchant, in embodiments of the present invention, the transaction data may be enriched with merchant attributes data including a normalized merchant name.

In addition, additional merchant attributes data may be retrieved and associated with transaction data for "Big Box Outlet—SF", including, but not limited to, the merchant address (e.g., "555 Market St., San Francisco, Calif. 94105") and the merchant corporate name (e.g., "Big Box Corporation").

Returning to the flowchart of FIG. 7, in step 712, the server computer 108a may associate one or more of the merchant attributes for the merchant stored in the merchant attributes database 108e with the transaction data. In some embodiments, the transaction data may be modified by a messaging module 108c-3 and the processor 108b to include the merchant attributes from the merchant attributes database 108e.

In other embodiments, a separate merchant attributes message may be generated by the messaging module 108c-3 and the processor 108b to include the merchant attributes. In such embodiments, the messaging module 108c-3 and the processor 108b may generate a unique identifier (e.g., a numeric or alphanumeric value, token, or other identifier), and associate the identifier with the merchant attributes message. In such embodiments, the transaction data and the merchant attributes message may then be correlated with each other via the unique identifier by an issuer computer 110 and/or a data analyzer computer 112.

The messaging module 108c-3 and the processor 108b may route and transmit the transaction data and the merchant attributes message to the data analyzer computer 112. The data analyzer computer 112 may use the merchant attributes data included in the merchant attributes message to perform a transaction analysis. For example, as all transactions related to a particular merchant may be associated and correlated to each other using the merchant attributes data (e.g., the merchant address data), the data analyzer computer 112 may perform data and transaction analyses on the transaction data. For example, the data analyzer computer 112 may determine the number of transactions associated with a particular merchant, may analyze fraud history associated with the particular merchant, or may analyze a transaction and chargeback history associated with the particular merchant.

Figure 8:
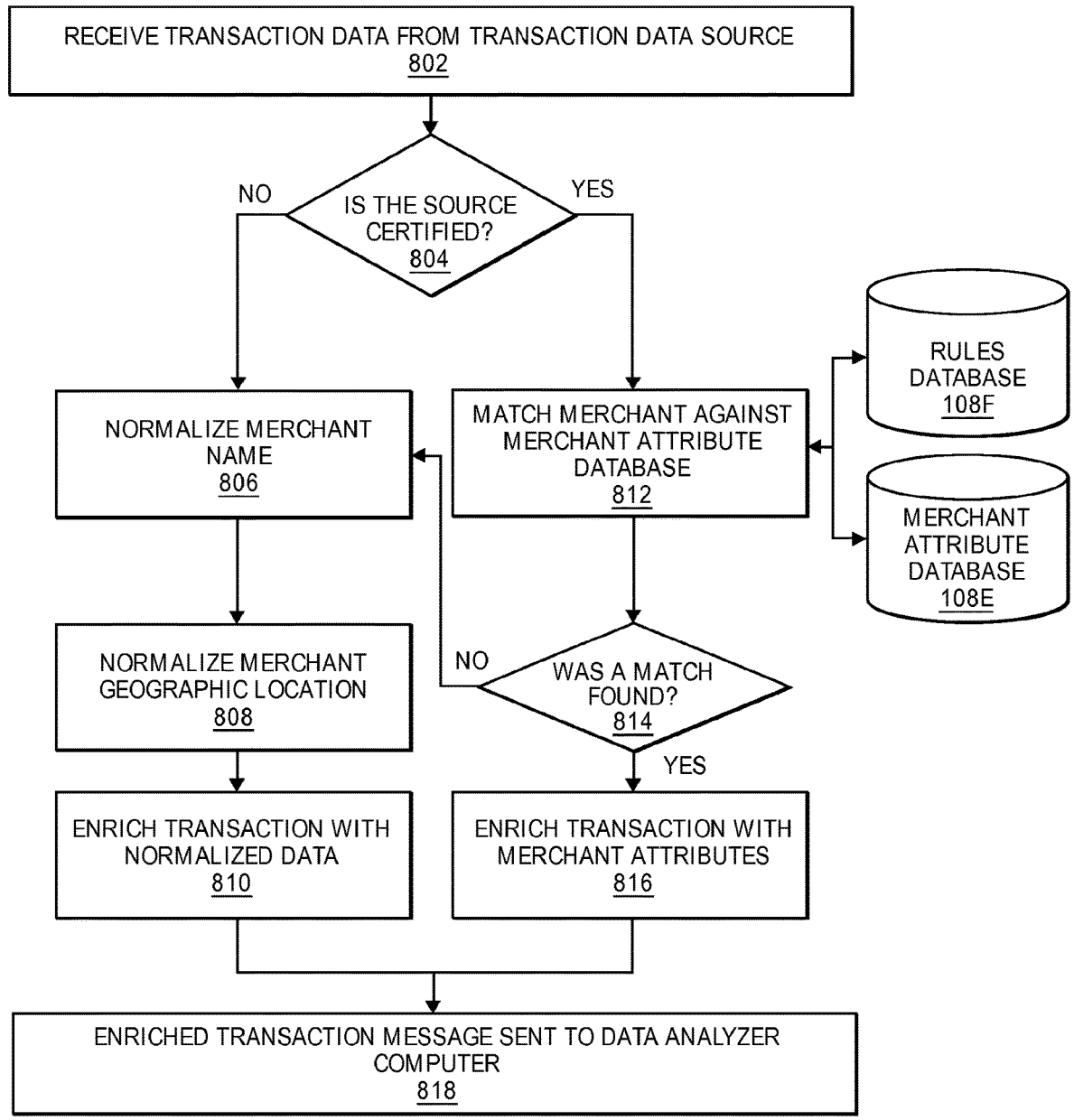
FIG. 8 shows a flow diagram depicting a process for analyzing merchant data in a transaction data message to enrich the transaction data according to an embodiment of the invention.

FIG. 8 depicts a more detailed diagram of the process described with respect to FIG. 7. FIG. 8 shows a flow diagram 800 depicting a process for analyzing merchant data in a transaction data message to enrich the transaction data according to an embodiment of the invention.

As depicted in FIG. 8, in step 802, transaction data is received from a transaction data source. In some embodiments, the transaction data source may be an acquirer computer 106. In other embodiments, the transaction data source may be another computer that processes transactions on behalf of an acquirer computer 106, an issuer computer 110, or a third party computer unrelated to the transaction.

In step 804, the transaction analyzer module 108c-1 and the processor 108b determines if the transaction data source is a certified data source. The process of certifying a transaction data source is described below with respect to FIGS. 5 and 9.

When the transaction data source is not certified, it may be an indication that the transaction data source has not previously provided merchant attributes data to the payment processing network 108. In such situations, in steps 806 and 808, the merchant data processing module 108c-2 and the processor 108b may normalize a merchant name and normalize a merchant geographic location included in the transaction data, as described above with respect to FIGS. 2-4. In some embodiments, the merchant name and the merchant geographic location may be in a normalized form when the transaction data is received.

In step 810, the normalized merchant name and normalized merchant geographic location, generated in steps 806 and 808, may be used to enrich the received transaction data.

In step 812, when the data source is certified, the transaction analyzer module 108c-1 and the processor 108b may retrieve matching rules from the rules database 108f to determine the merchant associated with a merchant identifier included in the transaction data.

In step 814, the transaction analyzer module 108c-1 and the processor 108b determines whether the received transaction data matches merchant data from the merchant attributes database 108e In some embodiments, if the merchant identifier does not match a key field in the merchant attributes database 108e, the merchant data processing module 108c-2 and the processor 108b may normalize the merchant name and the merchant geographic location included in the transaction data and modify and enrich the transaction data with the normalized data, as described above with respect to steps 806-810.

In some embodiments, the merchant identifier is associated with a key field in a merchant attributes database 108e. The merchant identifier may then be used to retrieve merchant attributes data from the merchant attributes database 108e.

In step 816, the merchant attributes data may then be associated with the transaction data. In some embodiments, the transaction data may be modified and enriched to include the merchant attributes data.

In some embodiments, the normalized data generated to enrich the transaction data when the source is not certified and/or when merchant attributes data associated with a merchant are not found in the merchant attributes database 108e, may be a subset of the merchant attributes data retrieved from the merchant attributes database 108e when the merchant attributes database 108e includes merchant attributes data associated with the merchant.

In step 818, the transaction data may then be sent to a data analyzer computer 112 by the routing module 108c-4 and the processor 108b for further processing and analysis. The data analyzer computer 112 may use the data to generate reports, including number of transactions performed by a specific merchant, fraud rates for a specific merchant location, data on consumers who purchase from a competitor location, etc.

Data Source Certification

Figure 5:
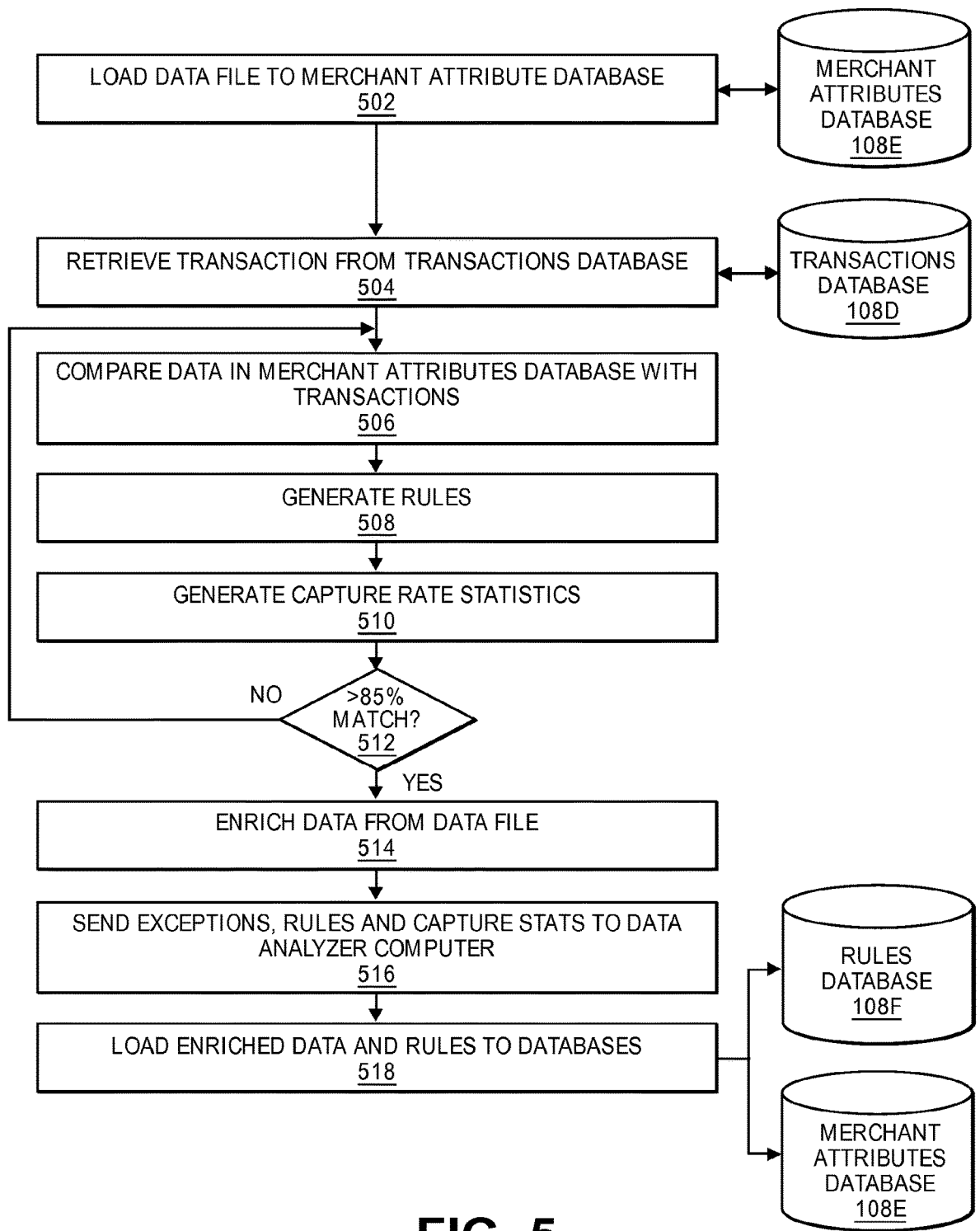
FIG. 5 shows a flow diagram depicting a process for certifying a data source and storing merchant attributes obtained from the data source according to an embodiment of the present invention.
Figure 9:
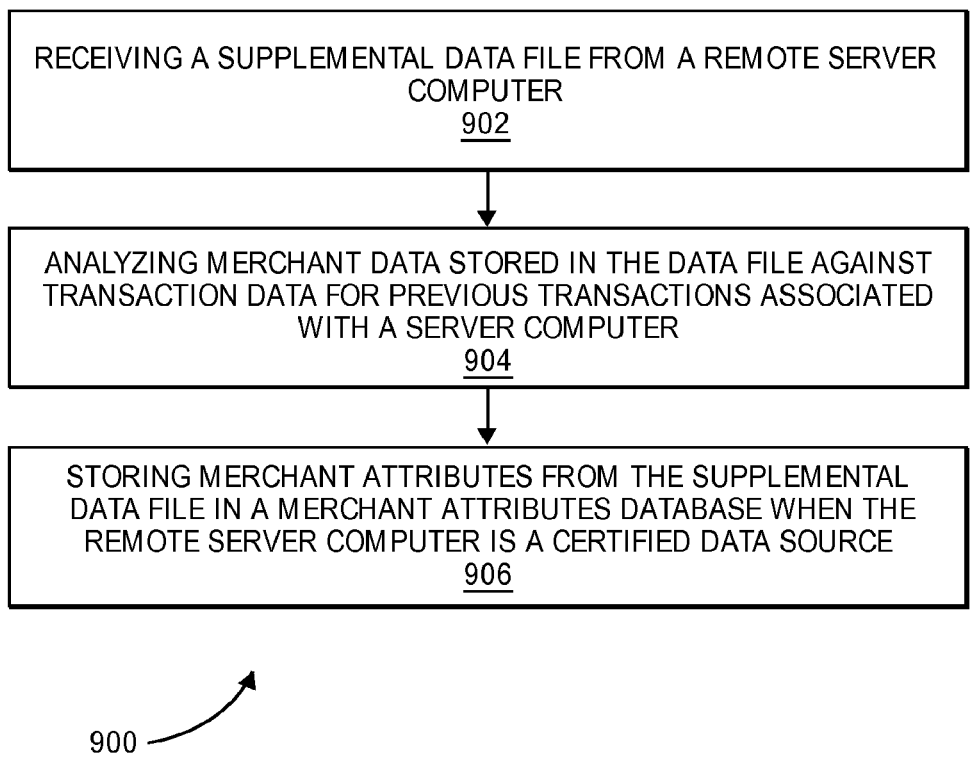
FIG. 9 shows a flowchart describing an exemplary method of analyzing merchant data from a remote server computer according to an embodiment of the present invention.

A method of certifying a data file according to embodiments of the invention can be described with respect to FIGS. 1, 5 and 9. In the embodiment described below, the data file is an acquirer data file received from an acquirer computer 106. In other embodiments, the data file may also be from an issuer computer 110 and/or a third party source.

FIG. 9 shows a flowchart 900 describing an exemplary method of analyzing merchant data from a remote server computer according to an embodiment of the present invention.

In step 902, a server computer 108a in the payment processing network 108 receives a data file from a remote server computer. In some embodiments, the remote server computer may be an acquirer computer 106. In such embodiments, the data file may be merchant data obtained and stored by the acquirer computer 106. The data file may be an acquirer merchant master file that includes merchant attributes (e.g., merchant location data [e.g., merchant address] and card acceptor identifiers) associated with each merchant. The data file may be received from an acquirer data file database 106a at the acquirer computer 106. In some embodiments, the data file may be received from a third party server computer and contain merchant data collected by a third party.

In some embodiments, the merchant data in the data file may be loaded into the merchant attributes database 108e. In other embodiments, the merchant data in the data file may be loaded into a temporary database or temporary table at the payment processing network 108.

In step 904, the server computer 108a analyzes merchant data stored in the data file against transaction data for previous transactions associated with the server computer 108a. When the server computer 108a receives the data file from the acquirer computer 106, a merchant data processing module 108c-2 and the processor 108b may analyze the merchant data stored in the data file. The merchant data processing module 108c-2 and the processor 108b may retrieve a set of previous transactions from a transactions database 108d. The set of previous transactions may be prior transactions processed by the payment processing network 108 associated with the server computer 108a. The set of previous transaction may be retrieved for a set period (e.g., 30 days, 60 days). The set of transactions may include transactions where authorization processes and clearing and settlement processes have been conducted through the payment processing network 108.

The merchant data processing module 108c-2 and the processor 108b may analyze the merchant data against the set of transactions. The rule generation module 108c-5 and the processor 108*b* may generate a set of rules for cross-referencing and matching the set of previous transactions with merchant data from the data file. The set of rules may be generated based on evaluating the card acceptor identifier or other merchant identifiers.

The set of rules may be based on evaluating the merchant name, merchant location (e.g., address, zip code, latitude/longitude comparison), and/or other merchant data. For example, an entry for "Joe's Flowers" and "Joseph's Flowers" may be correlated based on evaluating the name and the location data. If the latitude and longitude of "Joe's Flowers" and "Joseph's Flowers" are within a threshold of each other, the system may recognize "Joe's Flowers" and "Joseph's Flowers" as being the same merchant.

In some embodiments, the set of rules may be automatically generated by the rule generation module 108*c*-5 and the processor 108*b*. In such embodiments, the set of rules may be generated by the rule generation module 108*c*-5 and confirmed by a user. In other embodiments, the set of rules may be customizable and defined by a user.

The merchant data processing module 108*c*-2 and the processor 108*b* may determine the number of transactions that can be correlated to a specific merchant in the data file. The merchant data processing module 108*c*-2 and the processor 108*b* may then generate capture statistics to determine what percentage of transactions were correlated to a specific merchant in the data file.

In step 906, the server computer 108*a* stores merchant attributes from the data file in a merchant attributes database 108*e* when the remote server computer is a certified data source. When the percentage of transactions correlated to a specific merchant in the data file is above a predetermined threshold value (e.g., 85 percent), the data file source (e.g., the acquirer computer 106) may be considered a certified data source. In some embodiments, the predetermined threshold value may be customizable by a user or be predefined by the system. In such scenarios, the merchant attributes from the data file may be stored in the merchant attributes database 108*e*. In some embodiments, the merchant attributes may be enriched or modified by the merchant data processing module 108*c*-2.

In some embodiments, transactions that are not correlated to a merchant in the data file may be sent back to the acquirer computer 106 in a notification message. In such embodiments, the merchant data processing module 108*c*-2 and the processor 108*b* may request that future supplemental data files from the include merchants that were not included in the data file.

FIG. 5 depicts a more detailed diagram of the process described with respect to FIG. 9. FIG. 5 shows a flow diagram depicting a process for certifying a data source and storing merchant attributes obtained from the data source according to an embodiment of the present invention.

In step 502, when a data file is received by the payment processing network 108 from a remote server computer (e.g., an acquirer computer 106), the data file may be loaded into a merchant attributes database 108*e*. In some embodiments, the merchant data in the data file may be loaded into a temporary database or temporary table at the payment processing network 108.

The supplemental data file may include merchant attributes data stored by the remote server computer. In some embodiments, the data file may be an acquirer merchant master file.

In step 504, a transaction analyzer module 108*c*-1 and the processor 108*b* may then retrieve transaction data for previous transactions from a transactions database 108*d*.

In step 506, the transaction analyzer module 108*c*-1 and the processor 108*b* may then compare merchant data from the data file with the retrieved transactions.

In step 508, a rule generation module 108*c*-5 and the processor 108*b* may generate rules for cross-referencing the merchant attributes data from the data file with the transaction data. For example, the rules may be based on correlating strings of characters of the merchant name in the data file with the merchant name in a previously-performed transaction. The rules may be used to determine which transactions from the retrieved transactions match or can be correlated to merchant attributes data from the data file.

In step 510, capture rate statistics may then be generated based on the results of the matching process. In some embodiments, when the capture rate (e.g., the percentage of transactions that can be matched to merchant attributes data) is greater than a predetermined threshold, the source of the data file may be determined to be a certified data source.

In step 512, for example, the predetermined threshold may be 85%. In this example, when the capture rate is above 85%, the data source may be certified. Other embodiments may establish smaller or higher thresholds, and the threshold may be either customizable by a user or predefined by the payment processing network 108 or by another party related to the transaction.

When the data source is not certified (e.g., the capture rate is below the predetermined threshold), the payment processing network 108 may not store the merchant attributes data from the data file. In such embodiments, the transaction analyzer module 108*c*-1 may evaluate additional data files from the remote server computer.

In step 514, in situations where the data source is certified (e.g., the capture rate is above the predetermined threshold), the merchant attributes data may be enriched or modified by the merchant data processing module 108*c*-2 and the processor 108*b*. Enriching or modifying the merchant attributes data may include normalizing the raw merchant data, correcting any errors, normalizing address data, and adding additional merchant data, including merchant location latitude and longitude.

In step 516, the server computer 108*a* may also be configured to send data messages include merchant data, rules and the capture rate statistics to a data analyzer computer 112. The data analyzer computer 112 may be configured to receive the merchant data in a notification message, which may indicate merchants involved in transactions that could not be correlated to merchant attributes data in the data file. The messaging module 108*c*-3 and the processor 108*b* may be configured to generate a notification message indicating the one or more merchants where corresponding merchant attributes were not located in the data file. The notification message may also be sent to the remote server computer (e.g., the acquirer computer) to request merchant attributes data for merchants not found in the data file.

The data analyzer module 112 may be configured to attempt to identify merchant data for these merchants. The capture rate statistics may indicate to the data analyzer computer 112 the percentage of transactions that can be matched to merchant attributes data. In some embodiments, the merchant data may also be sent to the remote server computer (e.g., an acquirer computer 106) that sent the data file to the payment processing network 108.

In step 518, the merchant attributes data from the data file may then be loaded into or stored in the merchant attributes database 108*e*. The rules generated by the rule generation module 108*c*-5 and the processor 108*b* may be stored in a rules database 108*f*. In some embodiments, the rules and the merchant attributes data are stored by the server computer 108*a* when the remote server computer is a certified data source.

III. ADDITIONAL EMBODIMENTS

In additional embodiments, enriching the transaction using merchant attributes data stored at the payment processing network may be performed in real-time as transactions are occurring rather than after transactions have been completed. In such embodiments, after the merchant attributes data has been associated with the transaction data, the merchant attributes data and the transaction data may be transmitted to an issuer computer associated with the transaction by a routing module. The transaction data and the merchant attributes data may be routed to the appropriate issuer computer based on the payment data included in the transaction data. In such embodiments, the issuer computer may use merchant attributes data included in the merchant attributes message for transaction authorization processing.

In some embodiments, the merchant attributes data from the merchant attributes database may be used by the issuer computer in making a fraud determination or authorization decision.

For example, as a consumer initiates a transaction using a payment device 114 at an access device 116 at Big Box Outlet—SF in FIG. 2, transaction data or a transaction message (e.g., an authorization request message) may be sent from the access device 116 through a merchant computer 104 and an acquirer computer 106 to a server computer 108*a* in a payment processing network 108. The merchant data processing module 108*c*-2 and the processor 108*b* may modify the merchant name in the transaction data. As shown in FIG. 3A, "Big Box Outlet—SF" may be modified to a normalized merchant name (e.g., "Big Box Outlet") or a doing business as (DBA) name (e.g., "Big Box").

The transaction analyzer module 108*c*-1 and the processor 108*b* may then analyze the transaction data using the normalized merchant name (e.g., "Big Box"). The transaction analyzer module 108*c*-1 and the processor 108*b* may determine whether the merchant attributes database 108*e* includes merchant attributes data for the merchant (e.g., "Big Box") associated with the transaction data.

When the merchant is located in the merchant attributes database 108*e*, the transaction data may be enriched with merchant attributes retrieved from the merchant attributes database 108*e*. For example, a fraud score or fraud data associated with the Big Box Outlet—SF location may be retrieved from the merchant attributes database 108*e*. Additional merchant attributes data may also be retrieved from the merchant attributes database 108*e*, including merchant address data (e.g., street, city, zip) and merchant name data. The messaging module 108*c*-3 and the processor 108*b* may generate a merchant attributes message including the retrieved merchant attributes (e.g., the fraud score). The merchant attributes message may then be sent with the transaction data to an issuer computer by the routing module 108*c*-4 and the processor 108*b*, where the issuer computer 110 may use the merchant attributes data in determining whether the transaction should be authorized or declined. In some embodiments, the transaction data and the merchant attributes data may be sent in a single message. In some embodiments, the transaction data and the merchant attributes data may be sent in separate messages and associated using a unique identifier.

In the example described above, without the merchant attributes data, the issuer computer 110 may receive transaction data as shown in FIG. 2. Although all three raw merchant names 202 are for the same merchant, "Big Box", where different acquirer computers 106 process transactions for the same merchant, different raw merchant names may be used (e.g., "Big Box Outlet—SF", "Shoes*BigBox*Outlet").

The issuer computer 110, receiving transactions with the different raw merchant names may not recognize that they are all related to the same merchant. In addition, if there are any fraud indicators or fraud scores associated with each raw merchant name, the fraud indicators or fraud scores may be incomplete or inaccurate as they may not be based on all transactions associated with the merchant "Big Box". For example, there may be a higher fraud risk score associated with "Shoes*BigBox*Outlet," but if the transaction data received by the issuer computer 110 includes "Big Box Outlet—SF," the issuer computer 110 may only evaluate transactions and fraud data associated with a merchant name "Big Box Outlet—SF".

By using embodiments of the invention, however, the transaction data received from the acquirer computer 106 may be enriched with merchant attributes data, including fraud scores or fraud indicators for all transactions related to "Big Box." This may allow the issuer computer 110 to make a more informed decision about authorizing transactions conducted at "Big Box."

IV. TECHNICAL BENEFITS

Embodiments of the present invention provide a number of advantages and technical benefits. For example, embodiments of the present invention provide increased fraud detection through the aggregation of transaction data related to the same merchant. Typically, merchant data (e.g., merchant name, merchant location) can be inconsistently labeled as there is not a unique merchant identifier associated with a merchant across different systems and entities, as illustrated in FIG. 2. It was difficult to ascertain all the transactions related to the same merchant where different systems and entities utilized disparate formulations of a merchant identification (e.g., merchant name or merchant location). Embodiments of the present invention solve the deficiency in the prior art by associating transactions involving the same merchant using merchant attributes data retrieved from acquirers computers and third party sources, associated with transaction data.

Embodiments of the present invention also provide the capability to ascertain all the transactions related to the same merchant. This ensures greater security from fraud by identifying fraud trends that may be not be identified where related transactions cannot be identified or associated with each other. Further, by recognizing interactions that may be indicative of fraud, an additional benefit of embodiments of the present invention is a reduction in the number of fraudulent transactions being authorized and processed. By reducing the amount of fraudulent activity, system resources that would be used to deal with fraudulent activities (e.g., monitoring, chargebacks, processing fraudulent transaction, etc.) may be correspondingly reduced.

V. EXEMPLARY APPARATUSES

Examples of such subsystems or components are shown in FIG. 10. The subsystems shown in FIG. 10 are interconnected via a system bus 1000. Additional subsystems such as a printer 1008, keyboard 1014, fixed disk 1016 (or other memory comprising computer readable media), monitor 1020, which is coupled to display adapter 1010, and others are shown. Peripherals and input/output (I/O) devices, which couple to I/O controller 1002 (which can be a processor or other suitable controller), can be connected to the computer system by any number of means known in the art, such as serial port 1012. For example, serial port 1012 or external interface 1018 can be used to connect the computer apparatus to a wide area network such as the Internet, a mouse input device, or a scanner. The interconnection via system bus allows the central processor 1006 to communicate with each subsystem and to control the execution of instructions from system memory 1004 or the fixed disk 1016, as well as the exchange of information between subsystems. The system memory 1004 and/or the fixed disk 1016 may embody a computer readable medium.

Further, while the present invention has been described using a particular combination of hardware and software in the form of control logic and programming code and instructions, it should be recognized that other combinations of hardware and software are also within the scope of the present invention. The present invention may be implemented only in hardware, or only in software, or using combinations thereof.

The software components or functions described in this application may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

The above description is illustrative and is not restrictive. Many variations of the technology will become apparent to those skilled in the art upon review of the disclosure. The scope of the technology should, therefore, be determined not with reference to the above description, but instead should be determined with reference to the pending claims along with their full scope or equivalents.

In some embodiments, any of the entities described herein may be embodied by a computer that performs any or all of the functions and steps disclosed.

One or more features from any embodiment may be combined with one or more features of any other embodiment without departing from the scope of the technology.

Any recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
   receiving, by a server computer, transaction data associated with a first transaction between a user and a merchant;
   retrieving, by the server computer, a string of characters of a merchant name from the transaction data;
   evaluating, by the server computer, the string of characters of the merchant name with a set of rules;
   normalizing, by the server computer using the set of rules, the merchant name to form a normalized merchant name, the normalized merchant name being a common format for different raw names for the merchant;
   storing, by the server computer, the normalized merchant name in association with the string of characters of the merchant name in a database;
   receiving, by the server computer, an authorization request message for a second transaction comprising the string of characters of the merchant name and a transaction amount;
   determining, by the server computer, the normalized merchant name from the string of characters of the merchant name;
   modifying, by the server computer in real time, the authorization request message to include the normalized merchant name from the database; and
   transmitting, by the server computer, the authorization request message with the normalized merchant name to an issuer computer.

2. The method of claim 1, wherein the authorization request message is a second authorization request message, and wherein the transaction data in the first transaction is present in a first authorization request message.

3. The method of claim 1, wherein the authorization request message is received by the server computer via an acquirer computer.

4. The method of claim 1, wherein receiving the authorization request message, determining the normalized merchant name from the string of characters of the merchant name, and transmitting the authorization request message with the normalized merchant name, occur in real time.

5. The method of claim 1, further comprising:
   determining, by the server computer, a fraud trend associated with the normalized merchant name.

6. The method of claim 1, wherein the server computer is in a payment processing network configured to process credit and debit card transactions.

7. The method of claim 1, further comprising:
   determining, by the server computer, that a source of the transaction data is a certified data source.

8. The method of claim 1, further comprising:
   receiving an authorization response message for the second transaction from the issuer computer.

9. The method of claim 1, wherein the authorization request message comprises an account identifier.

10. The method of claim 1, wherein the authorization request message comprises a merchant category code.

11. The method of claim 1, wherein the authorization request message is a second authorization request message from a POS terminal of the merchant, and wherein the transaction data are present in a first authorization request message from the POS terminal.

12. The method of claim 11, wherein the first transaction is a first payment transaction, the second transaction is a second payment transaction, wherein the POS terminal is a first POS terminal, the string of characters is a first string of characters associated with a first raw merchant name, and wherein the first authorization request message and the second authorization request message are received from the first POS terminal via a first acquirer computer, and wherein the method further comprises:
  receiving, by the server computer, a third authorization request message comprising a second string of characters different from the first string of characters from a second POS terminal of the merchant from a second acquirer computer in a third payment transaction, the second string of characters associated with a second raw merchant name;
  modifying, the server computer, the third authorization request message to include the normalized merchant name; and
  transmitting, by the server computer, the third authorization request message with the normalized merchant name to the issuer computer for authorization.

13. A server computer comprising:
  a processor; and
  a tangible non-transitory computer readable medium coupled to the processor, the tangible non-transitory computer readable medium comprising code, executable by the processor to cause the processor to perform a method comprising:
  receiving transaction data associated with a first transaction between a user and a merchant;
  retrieving a string of characters of a merchant name from the transaction data;
  evaluating the string of characters of the merchant name with a set of rules;
  normalizing using the set of rules, the merchant name to form a normalized merchant name, the normalized merchant name being a common format for different raw names for the merchant;
  storing the normalized merchant name in association with the string of characters of the merchant name in a database;
  receiving an authorization request message for a second transaction comprising the string of characters of the merchant name and a transaction amount;
  determining the normalized merchant name from the string of characters of the merchant name;
  modifying the authorization request message in real time to include the normalized merchant name from the database; and
  transmitting the authorization request message with the normalized merchant name to an issuer computer.

14. The server computer of claim 13, wherein the authorization request message is a second authorization request message, and wherein the transaction data in the first transaction is present in a first authorization request message.

15. The server computer of claim 13, wherein the authorization request message is received by the server computer via an acquirer computer.

16. The server computer of claim 13, wherein receiving the authorization request message, determining the normalized merchant name from the string of characters of the merchant name, and transmitting the authorization request message with the normalized merchant name occur in real time.

17. The server computer of claim 13, wherein the method further comprises:
  retrieving another string of characters of a merchant address from the transaction data;
  evaluating the another string of characters of the merchant address with the set of rules; and
  normalizing, using the set of rules, the merchant address to form a normalized merchant address, the normalized merchant address being another common format for different raw addresses for the merchant.

18. The server computer of claim 13, wherein the method further comprises:
  determining, by the server computer, a fraud trend associated with the normalized merchant name.

19. The server computer of claim 13, wherein the authorization request message comprises a primary account number.

20. A system comprising:
  a server computer comprising
  a processor, and
  a tangible non-transitory computer readable medium coupled to the processor, the tangible non-transitory computer readable medium comprising code, executable by the processor to cause the processor to perform a method comprising,
  receiving transaction data associated with a first transaction between a user and a merchant,
  retrieving a string of characters of a merchant name from the transaction data,
  evaluating the string of characters of the merchant name with a set of rules,
  normalizing using the set of rules, the merchant name to form a normalized merchant name, the normalized merchant name being a common format for different raw names for the merchant,
  storing the normalized merchant name in association with the string of characters of the merchant name in a database,
  receiving an authorization request message for a second transaction comprising the string of characters of the merchant name and a transaction amount,
  determining the normalized merchant name from the string of characters of the merchant name,
  modifying the authorization request message in real time to include the normalized merchant name from the database, and
  transmitting the authorization request message with the normalized merchant name to an issuer computer; and
  the issuer computer in communication with the server computer.

* * * * *